(12) United States Patent
Numaoka et al.

(10) Patent No.: US 12,300,031 B2
(45) Date of Patent: May 13, 2025

(54) INFORMATION PROCESSING APPARATUS, INFORMATION PROCESSING METHOD, AND ARTIFICIAL INTELLIGENCE MODEL MANUFACTURING METHOD

(71) Applicant: SONY GROUP CORPORATION, Tokyo (JP)

(72) Inventors: Chisato Numaoka, Tokyo (JP); Masahiro Fujita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 407 days.

(21) Appl. No.: 17/755,126

(22) PCT Filed: Jul. 14, 2020

(86) PCT No.: PCT/JP2020/027336
§ 371 (c)(1),
(2) Date: Apr. 21, 2022

(87) PCT Pub. No.: WO2021/084810
PCT Pub. Date: May 6, 2021

(65) Prior Publication Data
US 2022/0366723 A1  Nov. 17, 2022

(30) Foreign Application Priority Data
Oct. 30, 2019  (JP) .................. 2019-197976

(51) Int. Cl.
*G06V 40/16* (2022.01)
*G06V 10/774* (2022.01)
*G06V 10/82* (2022.01)

(52) U.S. Cl.
CPC ........ *G06V 40/176* (2022.01); *G06V 10/7747* (2022.01); *G06V 10/82* (2022.01)

(58) Field of Classification Search
None
See application file for complete search history.

(56) References Cited

U.S. PATENT DOCUMENTS 10,176,161 B2 *  1/2019  Breedvelt-Schouten ...................
                                                    G06F 40/30
10,423,773 B1     9/2019  Huang
(Continued)

FOREIGN PATENT DOCUMENTS

| CN | 106548533 A | 3/2017 |
| CN | 106562792 A | 4/2017 |

(Continued)

OTHER PUBLICATIONS

International Search Report and Written Opinion of PCT Application No. PCT/JP2020/027336, issued on Sep. 8, 2020, 09 pages of ISRWO.

*Primary Examiner* — Anand P Bhatnagar
(74) *Attorney, Agent, or Firm* — XSENSUS LLP

(57) ABSTRACT

There is provided an information processing apparatus that includes a preprocessing unit that determines whether or not to permit provision of a service based on emotion recognition on the basis of a predetermined criterion, an emotion estimation processing unit that performs the emotion recognition for a user by using an artificial intelligence function, and a service providing processing unit that provides a service based on an emotion recognition result by the emotion estimation processing unit, in which, when the preprocessing unit determines to permit the provision of the service, the emotion estimation processing unit performs the emotion recognition or the service providing processing unit provides the service.

11 Claims, 13 Drawing Sheets

(56) References Cited

U.S. PATENT DOCUMENTS

| | | | |
|---|---|---|---|
| 10,726,465 B2 * | 7/2020 | Dey | G06Q 30/0633 |
| 10,949,918 B2 * | 3/2021 | Fidanza | G06Q 20/405 |
| 11,049,147 B2 * | 6/2021 | Chintalapoodi | H04N 21/4668 |
| 11,160,479 B2 * | 11/2021 | Takahashi | A61B 5/6802 |
| 11,481,809 B2 * | 10/2022 | Hutton | G06V 40/173 |
| 2015/0286627 A1 * | 10/2015 | Chang | G06F 40/205 |
| | | | 704/9 |
| 2017/0083757 A1 | 3/2017 | Enomoto et al. | |
| 2017/0102765 A1 * | 4/2017 | Yoneda | G06Q 30/0269 |
| 2017/0102783 A1 | 4/2017 | Shikii et al. | |
| 2017/0278172 A1 * | 9/2017 | Dey | G06Q 30/0633 |
| 2018/0075490 A1 * | 3/2018 | Chintalapoodi | G06Q 30/0261 |
| 2018/0184959 A1 * | 7/2018 | Takahashi | A61B 5/1118 |
| 2019/0050875 A1 * | 2/2019 | McCord | G06F 40/242 |
| 2019/0152492 A1 | 5/2019 | El Kaliouby | |
| 2019/0213429 A1 | 7/2019 | Sicconi | |
| 2019/0283762 A1 | 9/2019 | El Kaliouby | |
| 2022/0261862 A1 * | 8/2022 | Aznaurashvili | G06N 20/00 |

FOREIGN PATENT DOCUMENTS

| | | |
|---|---|---|
| CN | 106562793 A | 4/2017 |
| DE | 102016217297 A | 5/2017 |
| JP | 2017-059044 A | 3/2017 |
| JP | 2017-073107 A | 4/2017 |
| JP | 2017-167752 A | 9/2017 |
| JP | 2017-201499 A | 11/2017 |
| JP | 2019-020684 A | 2/2019 |

\* cited by examiner

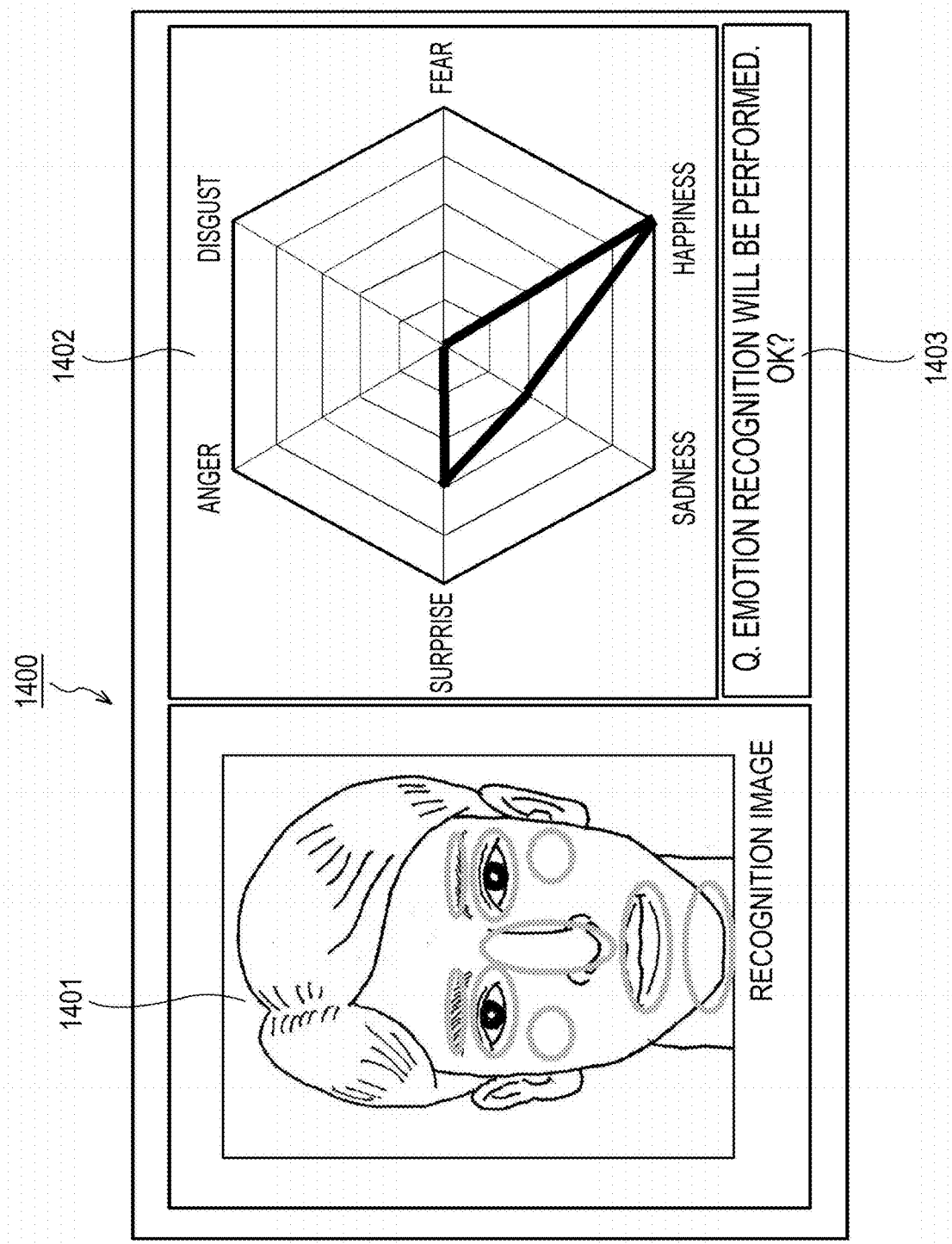

INFORMATION PROCESSING APPARATUS, INFORMATION PROCESSING METHOD, AND ARTIFICIAL INTELLIGENCE MODEL MANUFACTURING METHOD

CROSS REFERENCE TO RELATED APPLICATIONS

This application is a U.S. National Phase of International Patent Application No. PCT/JP2020/027336 filed on Jul. 14, 2020, which claims priority benefit of Japanese Patent Application No. JP 2019-197976 filed in the Japan Patent Office on Oct. 30, 2019. Each of the above-referenced applications is hereby incorporated herein by reference in its entirety.

TECHNICAL FIELD

A technology disclosed in the present specification (hereinafter, referred to as "the present disclosure") relates to an information processing apparatus that performs human emotion recognition, an information processing method, and an artificial intelligence model manufacturing method.

BACKGROUND ART

Recognizing a human emotion is extremely important for achieving human interaction and providing appropriate services to humans. By using data related to human expressions such as expressions, voices, and gestures, and data related to context, human emotions can be more accurately understood. For example, a technology of recognizing an emotion of a speaker from context information included in interaction using artificial intelligence using a neural network has been proposed (see Patent Document 1).

In a case of attempting to understand human emotions using facial expressions, there is known a method of analyzing a face image pattern (so-called expression) from a face image in an image captured by an image sensor, and estimating which emotion the face image pattern corresponds to. It is possible to estimate a human emotion by using artificial intelligence in which a correlation between a face image pattern and a human emotion is learned in advance. Note that the face image pattern can be configured by a combination of face parts such as eyebrows, eyes, nose, mouth, cheeks, and chin, but can also be configured by an image of the entire face image without being divided into face parts.

Artificial intelligence represented by a neural network can be applied to the emotion learning. For example, a plurality of labels related to emotions such as "anger", "disgust", "fear", "happiness", "sadness", and "surprise" is defined. Then, the face image pattern is used as an input of the neural network, the output of the neural network is associated with labels of emotions such as "anger", "disgust", "fear", . . . , each face image pattern input to the neural network is compared with a label of an output considered to be appropriate, and thereby the neural network is learned or trained.

By performing emotion recognition using a neural network that has learned emotions in advance, human preferences and the like can be understood, and recommendation of appropriate services, products, and the like to humans can be achieved. Furthermore, by appropriately performing the emotion learning of the neural network, it is possible to detect a symptom in which human emotion expression is not well performed and provide guidance to an appropriate treatment as a medical service.

CITATION LIST

Patent Document

Patent Document 1: Japanese Patent Application Laid-Open No. 2019-20684

SUMMARY OF THE INVENTION

Problems to be Solved by the Invention

An object of a technology according to the present disclosure is to provide an information processing apparatus that performs human emotion recognition, an information processing method, and an artificial intelligence model manufacturing method.

Solutions to Problems

A first aspect of a technology according to the present disclosure is
an information processing apparatus including:
 a preprocessing unit that determines whether or not to permit provision of a service based on emotion recognition on the basis of a predetermined criterion;
 an emotion estimation processing unit that performs the emotion recognition for a user by using an artificial intelligence function; and
 a service providing processing unit that provides a service based on an emotion recognition result by the emotion estimation processing unit,
 in which, when the preprocessing unit determines to permit the provision of the service, the emotion estimation processing unit performs the emotion recognition or the service providing processing unit provides the service. The artificial intelligence function has performed learning to recognize emotions from facial expressions obtained by analyzing a face image of the user.

In a case where it is determined that agreement of the user is necessary on the basis of the criterion, the preprocessing unit performs processing of requesting the user to agree to use the emotion recognition result for the service. Furthermore, the preprocessing unit permits use of the emotion recognition result for the service under an exceptional condition that the user agrees although it is determined that the emotion recognition result is not available for the service.

In a case where the criterion includes data indicating that a plurality of artificial intelligence models is required, the preprocessing unit determines whether or not to permit the provision of the service on the basis of whether or not the emotion estimation processing unit includes a plurality of artificial intelligence models in a case where the criterion includes the data. Furthermore, the emotion estimation processing unit performs inference using a plurality of artificial intelligence models, and outputs a set of inference results by each of the artificial intelligence models as the emotion recognition result.

The information processing apparatus according to the first aspect further includes an emotion learning unit that performs learning of the artificial intelligence function so as to recognize a human emotion. Then, the preprocessing unit determines whether or not to permit learning of the artificial intelligence function on the basis of the criterion. The emotion learning unit performs training to input learning data to the artificial intelligence function and perform the emotion recognition when the preprocessing unit determines to permit the learning.

Furthermore, a second aspect of the technology according to the present disclosure is an information processing method including:

a preprocessing step of determining whether or not to permit provision of a service based on emotion recognition on the basis of a predetermined criterion;

an emotion estimation processing step of performing the emotion recognition for a user by using an artificial intelligence function when it is determined to permit the provision of the service in the preprocessing step; and a service providing processing step of providing a service based on an emotion recognition result by the emotion estimation processing step.

Furthermore, a third aspect of the technology according to the present disclosure is an artificial intelligence model manufacturing method of, in an artificial intelligence apparatus that provides a service using a result of emotion recognition using an artificial intelligence function, determining whether or not to permit provision of a service based on the emotion recognition on the basis of a predetermined criterion, and when determining to permit the provision of the service, performing training so as to enable emotion learning by inputting learning data to the artificial intelligence function, to manufacture an artificial intelligence model capable of the emotion recognition.

Effects of the Invention

According to a technology according to the present disclosure, it is possible to provide an information processing apparatus that performs human emotion recognition at a necessary level on the basis of predetermined guidelines, an information processing method, and an artificial intelligence model manufacturing method.

Furthermore, according to the technology according to the present disclosure, it is possible to provide an information processing apparatus that appropriately controls a level of emotion recognition through interaction with a human, an information processing method, and an artificial intelligence model manufacturing method.

Note that the effects described in the present specification are merely examples, and the effects brought by the technology according to the present disclosure are not limited thereto. Furthermore, in addition to the effects described above, the technology according to the present disclosure may further exert additional effects.

Still other objects, features, and advantages of the technology according to the present disclosure will become apparent from a detailed description based on embodiments as described later and accompanying drawings.

BRIEF DESCRIPTION OF DRAWINGS

FIG. 14 is a diagram illustrating a configuration example of a user interface screen of an emotion recognition utilization service.

MODE FOR CARRYING OUT THE INVENTION

Figure 1:
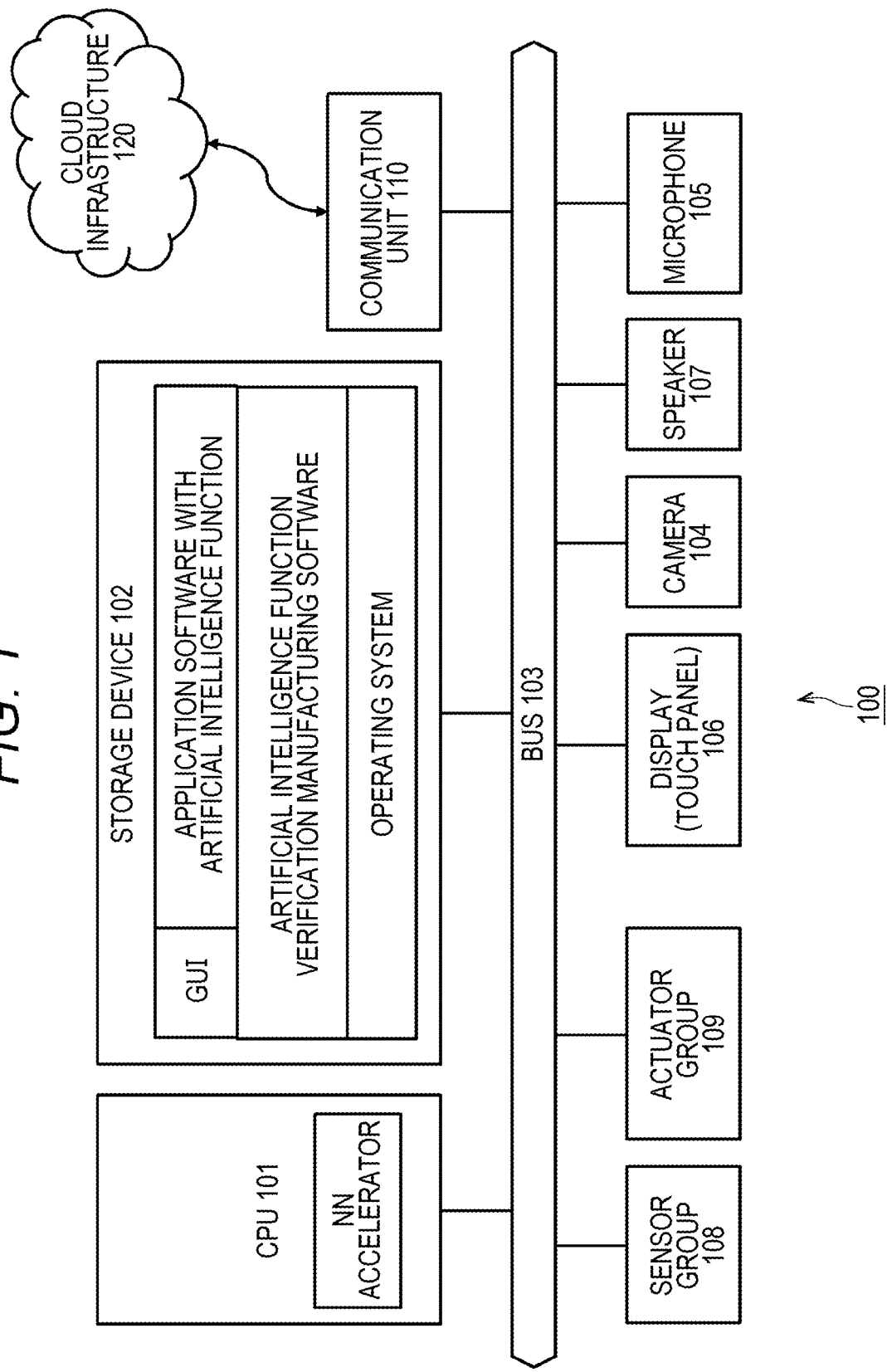
FIG. 1 is a diagram illustrating a hardware configuration example of an information processing apparatus 100.

Hereinafter, embodiments of the technology according to the present disclosure will be described in detail with reference to the drawings.

The emotion recognition technology is a useful technology applied to various industrial fields. However, the emotion recognition technology has the following problems.

(1) An inappropriate service is provided to a human by erroneously recognizing an emotion.

(2) There are people who do not feel good when their emotions are read.

With regard to the emotion erroneous recognition in (1) described above, it is necessary to consider that there is a possibility that the relationship between the emotion and the expression varies depending on the race, the region in which the person grows, or the like when the emotion learning is performed by the neural network. In a case where there is an ethnic or regional separation in training data used for learning (alternatively, in a case where a bias is applied), there is a possibility that an emotion is erroneously recognized with respect to a person in a race or a region that is not covered by the training data, and an inappropriate service is provided, resulting in an unpleasant experience.

Furthermore, in a case where a service for making a determination in association with emotion and occurrence of a crime is performed, there is a possibility that a criminal is erroneously estimated due to emotion erroneous recognition, which is a serious problem.

Furthermore, even in a case where human emotions can be accurately recognized using artificial intelligence for which emotion learning has been performed in advance, it is desirable to appropriately manage or control the emotion recognition results when the emotion recognition results are used for services such as product recommendation. In a case where there is a problem in the accuracy of the emotion learning, and as a result, the accuracy of the emotion recognition is not sufficiently high, it is also necessary to devise not to use the emotion recognition for the service.

Furthermore, even if emotion recognition is useful and bias of training data can be eliminated to achieve highly accurate emotion recognition, there are some people who do not feel good when their emotions are read as described in the above (2), and there is a situation where a service using emotion recognition is undesirable.

On the other hand, there are application fields in which a service is not established unless an emotion recognition technology is applied. An example is a case where emotion recognition is applied for the purpose of diagnosis of a predetermined disease in the medical field. Therefore, it is necessary to provide a mechanism for notifying a person who is a target of emotion recognition in advance that emotion recognition is performed when a service is provided or for requesting the person for understanding.

Furthermore, accuracy required for emotion recognition varies depending on the application field. That is, there is a field in which highly accurate emotion recognition is unnecessary, and on the other hand, there is a field in which emotion recognition with as high accuracy as possible is required.

Hereinafter, as a technology according to the present disclosure, an information processing apparatus that performs human emotion recognition using artificial intelligence capable of performing emotion learning so as not to cause erroneous recognition and performing control through interaction with a human so as to provide an emotion recognition service at a required level will be described.

A. System Configuration

FIG. 1 schematically illustrates a hardware configuration example of an information processing apparatus 100 to which a technology according to the present disclosure can be applied using an artificial intelligence function. The illustrated information processing apparatus 100 can be implemented in a form in which a peripheral device is appropriately externally connected to a general personal computer as necessary. Alternatively, the information processing apparatus 100 can be configured using a multifunctional information terminal such as a smartphone or a tablet, or can be configured on a robot device. Furthermore, the information processing apparatus 100 can also be configured to implement a part of functions such as artificial intelligence in a cloud infrastructure.

The information processing apparatus 100 includes a central processing unit (CPU) 101 that comprehensively controls the entire operation, and a storage device 102 that can be used as a local memory by the CPU 101.

In the present embodiment, it is assumed that the CPU 101 is equipped with a neural network (NN) accelerator. Furthermore, in addition to the CPU 101 (alternatively, instead of the CPU 101), another type of processor such as a general purpose graphic processing unit (GPGPU) may be used.

The storage device 102 includes a main memory and a cache memory configured using a dynamic random access memory (DRAM). Furthermore, the storage device 102 may include a mass external storage device such as a hard disk drive (HDD) or a solid state drive (SSD) by a virtual storage function provided by an operating system (OS) or the like.

Furthermore, in the information processing apparatus 100, various sensors and actuators are interconnected to the CPU 101 and the storage device 102 via a bus 103. The sensor data acquired by each sensor is taken into the storage device 102 via the bus 103 and appropriately processed by a computer program executed by the CPU 101. Furthermore, each actuator is driven on the basis of a command (alternatively, an execution result of the computer program) from the CPU 101.

The information processing apparatus 100 includes a camera 104 and a microphone 105 as sensors. The camera 104 is configured by using an image sensor such as a complementary metal oxide semiconductor (CMOS), a charge coupled device (CCD), or the like. The camera 104 may be a stereoscopic camera or a multi-view camera using two or more image sensors. Furthermore, the microphone 105 may be a microphone array using two or more sound collection elements.

Furthermore, the information processing apparatus 100 includes a display 106 and a speaker 107 as actuators. The display 106 includes a liquid crystal display (LCD), an organic electro-luminescence (EL) display, or the like. The display 106 may be a touch panel display in which a touch panel is superimposed on a screen. However, the touch panel can be classified into a sensor instead of an actuator. Furthermore, the speaker 107 may be a speaker array (multichannel speaker or super multichannel speaker) obtained by combining speakers obtained by combining a plurality of speakers. The speaker array may include an "acoustic surface" that vibrates the screen of the display 106 by one or more vibration exciters (actuators) that generate vibration to perform audio output.

The information processing apparatus 100 further includes another sensor group 108 and an actuator group 109. The sensor group 108 may include a general input device such as a keyboard and a mouse. Furthermore, the sensor group 108 may include various biometric sensors that sense biological information of a user who uses the artificial intelligence function, and various environment sensors that sense an environment in which the artificial intelligence function is used.

In the present embodiment, it is assumed that a plurality of computer programs including an OS, artificial intelligence function verification manufacturing software, application software with artificial intelligence function, and a graphical user interface (GUI) is installed in the storage device 102. The CPU 101 can execute these computer programs under an execution environment provided by the OS.

When operating on the CPU 101, the application software with artificial intelligence function indirectly accesses the function of the OS via a group of application programming interfaces (APIs) included in the artificial intelligence function verification manufacturing software. Then, the application software with artificial intelligence function is verified by the artificial intelligence function verification manufacturing software, and is manufactured through training of the artificial intelligence function, that is, learning of new data by the artificial intelligence function.

Furthermore, the information processing apparatus 100 operates a GUI on the storage device 102. The user can control the operation and input and output of the artificial intelligence function verification manufacturing software by using a GUI operation using a touch panel, a keyboard, or a mouse, or a voice input. Furthermore, in the information processing apparatus 100, an input and output operation using the camera 104, the microphone 105, the speaker 106, the other sensor group 108, or the actuator group 109 is performed as necessary during execution of the application software with artificial intelligence function.

Furthermore, the information processing apparatus 100 further includes a communication unit 110. The communication unit 110 has a wired communication function such as Ethernet (registered trademark) or a wireless communication function such as Wi-Fi (registered trademark), and is further interconnected to a cloud infrastructure 120 on an external network via a router (not illustrated) or the like. The cloud infrastructure 120 includes a server device, a storage, and the like. As described later, the information processing apparatus 100 includes an API that exchanges data with the cloud infrastructure 120 and requests part or all of processing related to the artificial intelligence function.

On the information processing apparatus 100, the artificial intelligence function verification manufacturing software operates to manufacture the artificial intelligence function mounted on the application software. The artificial intelligence function verification manufacturing software performs verification of input data and learning data to the artificial intelligence function, verification of output data of the artificial intelligence function, and the like in the process of manufacturing the artificial intelligence function, and details of this feature will be described later. Application software with an artificial intelligence function manufactured by the artificial intelligence function verification manufacturing software is application software with artificial intelligence function. The application software with artificial intelligence function may be operated on the same information processing apparatus 100 used for manufacturing the software with artificial intelligence function, or may be loaded on another apparatus and used.

Note that an apparatus in which the artificial intelligence function verification manufacturing software operates and which verifies or trains the artificial intelligence function is also referred to as "apparatus that verifies the artificial intelligence function" in the present specification. Furthermore, an apparatus in which an artificial intelligence function to be verified or trained by an apparatus that verifies the artificial intelligence function (alternatively, verification and training are completed) operates is also referred to as "apparatus with artificial intelligence function" in the present specification. A computer, a smartphone, a tablet, a robot device, or the like that executes application software with artificial intelligence function corresponds to the apparatus with artificial intelligence function.

The artificial intelligence generally uses a learning model represented by a neural network imitating a human cranial nerve circuit. A neural network is a network formed by coupling between artificial neurons (hereinafter, also simply referred to as "neuron") via synapses. The artificial intelligence includes a mechanism for constructing a learning model for estimating an optimal solution (output) to a problem (input) while changing a coupling weighting coefficient between neurons by repeating learning or training using learning data.

Hereinafter, an apparatus and a method for controlling a service using the artificial intelligence function will be described using an example in which the artificial intelligence function is applied to human emotion learning and emotion inference. However, it should be understood that the apparatus and the method for performing the service using the artificial intelligence function can be similarly applied to the artificial intelligence function applied other than the emotion learning and the emotion inference.

Figure 2:
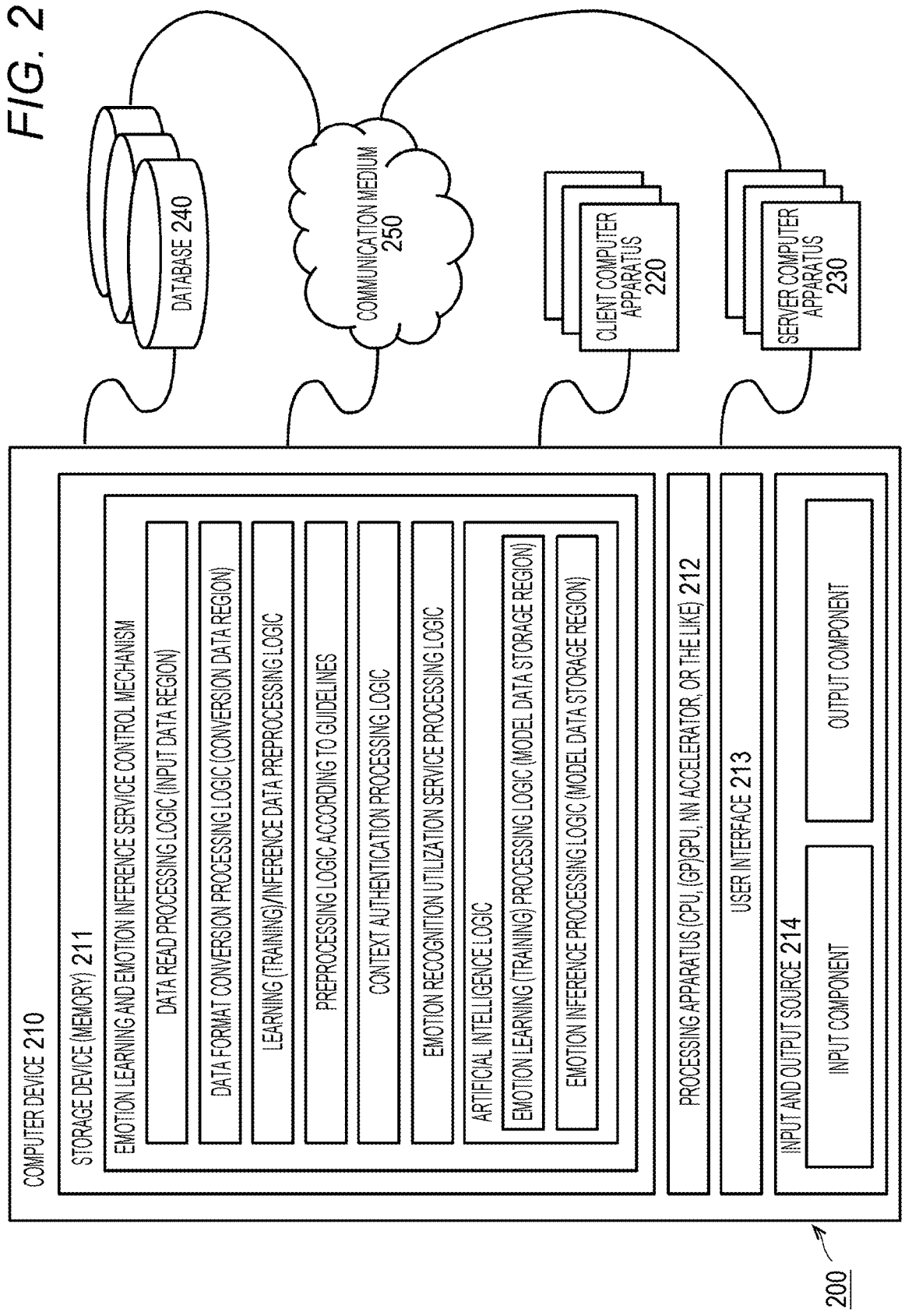
FIG. 2 is a diagram illustrating a functional configuration example of an artificial intelligence system 200.

FIG. 2 schematically illustrates a functional configuration example of an artificial intelligence system 200 that uses software including a service control mechanism for emotion learning and emotion inference as the artificial intelligence function according to the present disclosure.

The illustrated artificial intelligence system 200 is configured by interconnecting a computer device 210 provided with an emotion recognition and emotion inference service mechanism, one or more client computer apparatuses 220, one or more server computer apparatuses 230, and one or more databases 240. The client computer apparatus 220, the server computer apparatus 230, and the database 240 may be interconnected with the computer device 210 via a communication medium 250, or may be directly connected to the computer device 210. The computer device 210 corresponds to, for example, the information processing apparatus 100 illustrated in FIG. 1. The database 240 is arranged on an external storage. Furthermore, the communication medium 250 includes a cloud, proximity communication, the Internet, and the like.

The computer device 210 includes a storage device (memory) 211 having a virtual storage function, a processing apparatus (CPU or the like) 212, a user interface 213, and an input and output source 214.

The storage device 211 includes an emotion learning and emotion inference service control mechanism. Note that the emotion learning and emotion inference service control mechanism may be arranged not on the computer device 210 but on the server computer apparatus 230 on a cloud. Furthermore, all the logics included in the emotion learning and emotion inference service mechanism may be arranged on the computer device 210, or part or all of the logics may be arranged on the server computer apparatus 230 or the client computer apparatus 220 on the cloud. For example, logic related to learning may be distributed and arranged in a plurality of server computer apparatuses 230 on a cloud, and these may perform distributed learning.

Here, the "logic" refers to the one whose part or all are implemented by a computer program, data generated or used by the computer program, or a hardware circuit (including a memory circuit). On the storage device 211, a computer program of such logic is stored. Then, the processing apparatus 212 executes a computer program stored in the storage device 211.

In the artificial intelligence system 200 according to the present embodiment, the logic included in the emotion learning and emotion inference service control mechanism includes the following.

"Data read processing logic (input data region)"
"Data format conversion processing logic (conversion data region)"
"Learning (training)/inference data preprocessing logic"
"Preprocessing logic according to guidelines"
"Context authentication processing logic"
"Artificial intelligence logic"

Moreover, the artificial intelligence logic includes the following logic.

"Emotion learning (training) processing logic (including learning target model data storage region)"
"Emotion inference processing logic (including learned model data storage region)"

The input and output source 214 includes an input component and an output component. The input component is a sensor, a camera, a microphone, or the like. Furthermore, the output component is a display device, a speaker, another actuator, or the like.

Figure 3:
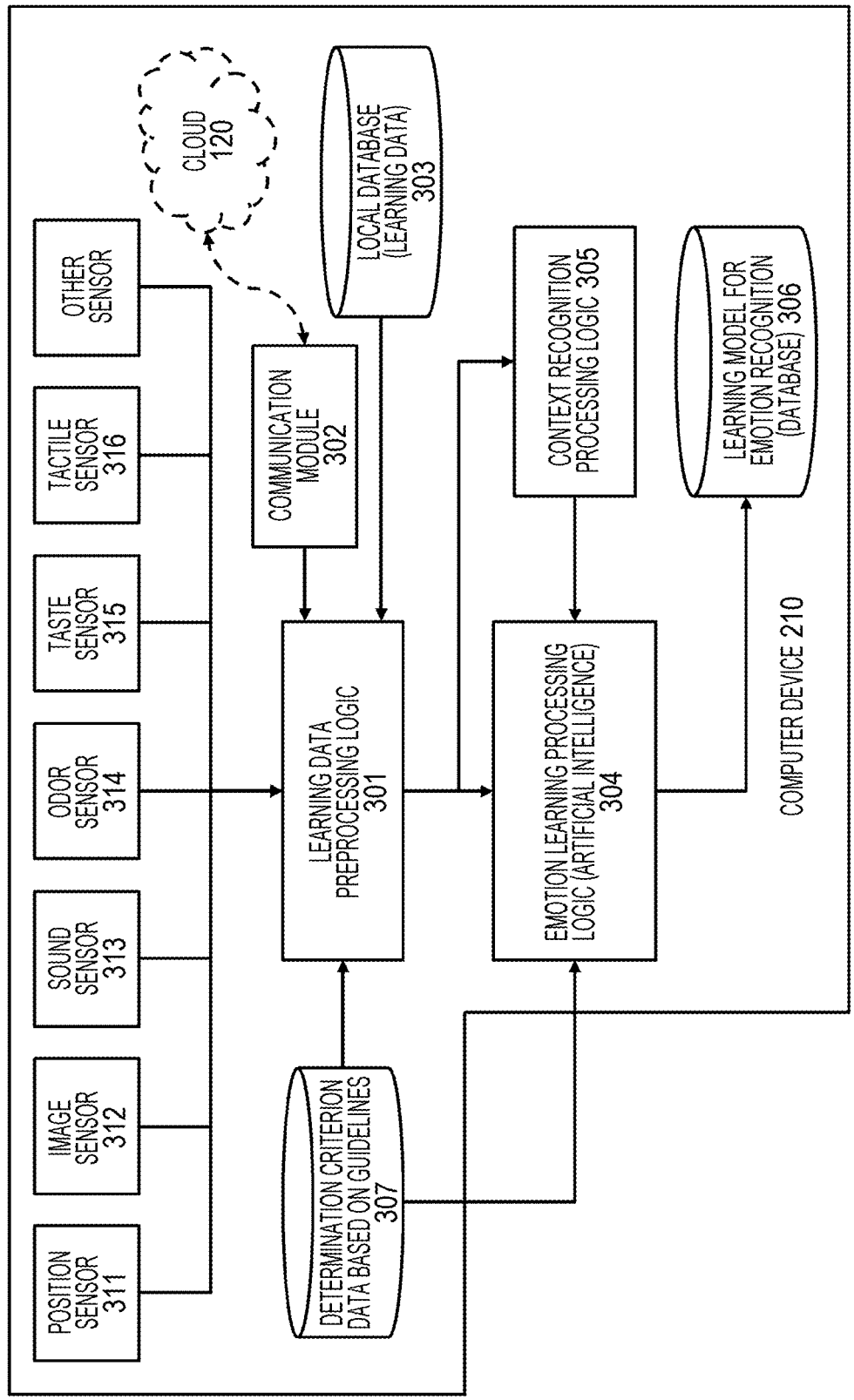
FIG. 3 is a diagram illustrating a functional configuration in a case where a computer device 210 performs emotion learning.

B. Control of Emotion Recognition Utilization Service Using Artificial Intelligence System B-1. Learning Phase FIG. 3 illustrates a functional configuration in a case where the computer device 210 to which the technology according to the present disclosure is applied performs emotion learning together with a schematic flow of processing. In the example illustrated in FIG. 3, the computer device 210 can be equipped with a position sensor (including a global positioning system (GPS) or the like) 311, an image sensor 312, a sound sensor (including a microphone or the like) 313, an odor sensor 314, a taste sensor 315, a tactile sensor 316, or other sensors as a group of sensors for learning an emotion and recognizing an emotion by the artificial intelligence function. Note that each of the sensors 311 to 316 . . . corresponds to the sensor group 108 provided in the information processing apparatus 100.

In a case of learning an artificial intelligence function that recognizes an emotion from a facial expression of a human, the computer device 210 needs to be equipped with at least the image sensor 312 and perform training of the artificial intelligence function by inputting image data acquired by the image sensor 312 to the artificial intelligence.

In general, the output data format from a sensor will vary depending on the type of sensor. In the configuration example illustrated in FIG. 3, a learning data preprocessing logic 301 performs conversion processing before input of converting a data format of output data from each of the sensors 311 to 316 . . . into a data format that can be input to the artificial intelligence that performs the emotion learning processing.

The learning data of the artificial intelligence function may be received from the outside (the cloud infrastructure 120) via a communication module 302 instead of being acquired from the sensors 311 to 316 . . . described above mounted in the computer device 210, or the learning data read from a local database 303 in the computer device 210 may be used. The communication module 302 corresponds to, for example, the communication unit 110 in FIG. 1.

The learning data preprocessing logic 301 inputs the learning data subjected to the conversion processing before input to each of an emotion learning processing logic 304 and a context recognition processing logic 305. The emotion learning processing logic 304 has an artificial intelligence function. Note that it is desirable that, for an input to the emotion learning processing logic 304, an output of the context recognition processing logic 305 and an output of the learning data preprocessing logic 301 are synchronously input such that relevance between the context to be recognized and RAW data from each of the sensors 311 to 316 . . . is learned.

Note that guidelines may be provided that the data to be provided to the emotion learning processing logic 304 should satisfy. Then, the learning data preprocessing logic 301 may use determination criterion data 307 based on the guidelines to check whether or not learning data to be input to the emotion learning processing logic 304 is appropriate from the viewpoint of ethics or the like. The determination criterion data 307 based on the guidelines is stored on local storage in the computer device 210 or on cloud storage (and so on).

The emotion learning processing logic 304 includes an artificial intelligence using a learning model such as a convolutional neural network (CNN), a deep neural network (DNN), a recurrent neural network (RNN), a reinforcement learning (reinforcement learning) neural network, an autoencoder, a spiking neural network (SNN), or a support vector machine (SVM). It is assumed that the artificial intelligence used in the emotion learning processing logic 304 according to the present embodiment includes a mechanism for learning a result of calculation by a loss function or the like through a technology in back propagation or the like to estimate an optimal solution (output) for a question (input).

The emotion learning processing logic 304 performs learning of the artificial intelligence for emotion recognition through training (for example, deep learning) by inputting new learning data to the artificial intelligence to manufacture new learning model for emotion recognition different from the model before training. In a case where the artificial intelligence is configured by a neural network, learning progresses so as to estimate an optimum output for an input while changing a coupling weighting coefficient between neurons by repeating learning using learning data, and a structured learning model for emotion recognition including the coupling weighting coefficient between neurons is manufactured. Then, the manufactured learning model for emotion recognition is stored in a database 306. The database 306 may be local storage in the computer device 210 or may be storage on the cloud infrastructure 120 (see FIG. 1).

The emotion learning processing logic 304 may check whether or not the manufactured (alternatively, learned by deep learning) learning model for emotion recognition is appropriate from the viewpoint of ethics or the like using the determination criterion data 307 based on the above-described guidelines, and then store the model in the database 306.

Note that, in a case where models of a plurality of neural networks $NN_1, NN_2, \ldots, NN_i$ is used for emotion inference (see the following description and FIG. 9), the emotion learning processing logic 304 manufactures each of the neural networks $NN_1, NN_2, \ldots, NN_i$, and stores the neural networks in the database 306.

Figure 4:
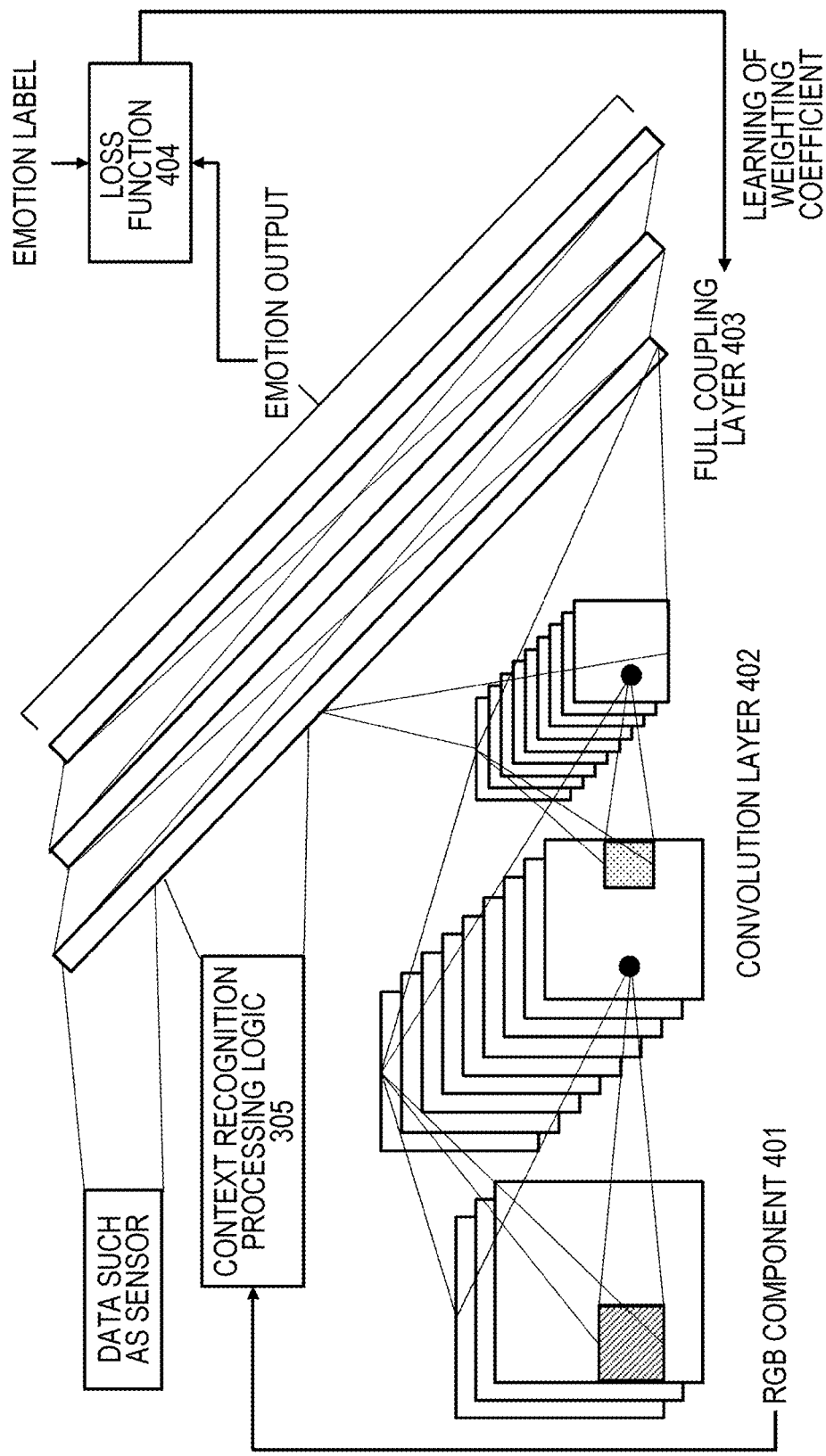
FIG. 4 is a diagram illustrating an implementation example of an emotion learning processing logic 304.

FIG. 4 illustrates an example in which the emotion learning processing logic 304 is implemented by supervised data using a DNN including a CNN. In the illustrated example, when data of RGB components 401 output from the image sensor 312 is input to the CNN constituting a multilayer convolution layer 402, the CNN outputs the feature of the RGB image from an output node. A full coupling layer 403 of the neural network inputs the following data.

Image feature data output from the output node of the CNN
Input data from other sensors or data placed in a database or cloud infrastructure
Output data from the context recognition processing logic The context recognition processing logic 305 receives the following inputs and inputs context information to an input layer of the full coupling layer 403 of the neural network.

RGB data output from the image sensor
Input from other sensors

Among the above, the other sensors may be any combination of sensors such as a Time-of-Flight (ToF) sensor (depth information sensor), a Dynamic Vision Sensor (DVS), an infrared sensor, a sound sensor (microphone), an odor sensor, a taste sensor, a tactile sensor, a temperature sensor, an altitude sensor, a GPS, or a rotation sensor and a torque sensor linked to a wheel drive system. Note that the DVS includes a SNN. Furthermore, inputs from other sensors may be directly input to the full coupling layer 403 without passing through the context recognition processing logic 305.

The output layer of the full coupling layer 403 is a node for emotion output. In a case of supervised learning, the node can be each emotion label (as an example, six outputs of anger, disgust, fear, happiness, sadness, and surprise). The emotion label is data provided to express facial expressions of a face image included in an input image from the image sensor 312.

A loss function 404 is a function defined using the emotion output and the emotion label as arguments. For example, the loss function 404 can be defined on the basis of the difference between the emotion output and the emotion label from all nodes of the full coupling layer 403. Then, learning or training of the neural network is performed so as to minimize the loss function 404 by modifying the coupling weighting coefficient between neurons from the output layer toward the input layer of the full coupling layer 403 using a method such as back propagation. The learning of the coupling weighting coefficient may be performed only for the full coupling layer 403, or the learning of the coupling weighting coefficient may be performed for all of the full coupling layer 403 and the convolution layer 402. In the present embodiment, the learning or training of the neural network is performed by deep learning.

B-2. Emotion Recognition Utilization Service (1)

Figure 5:
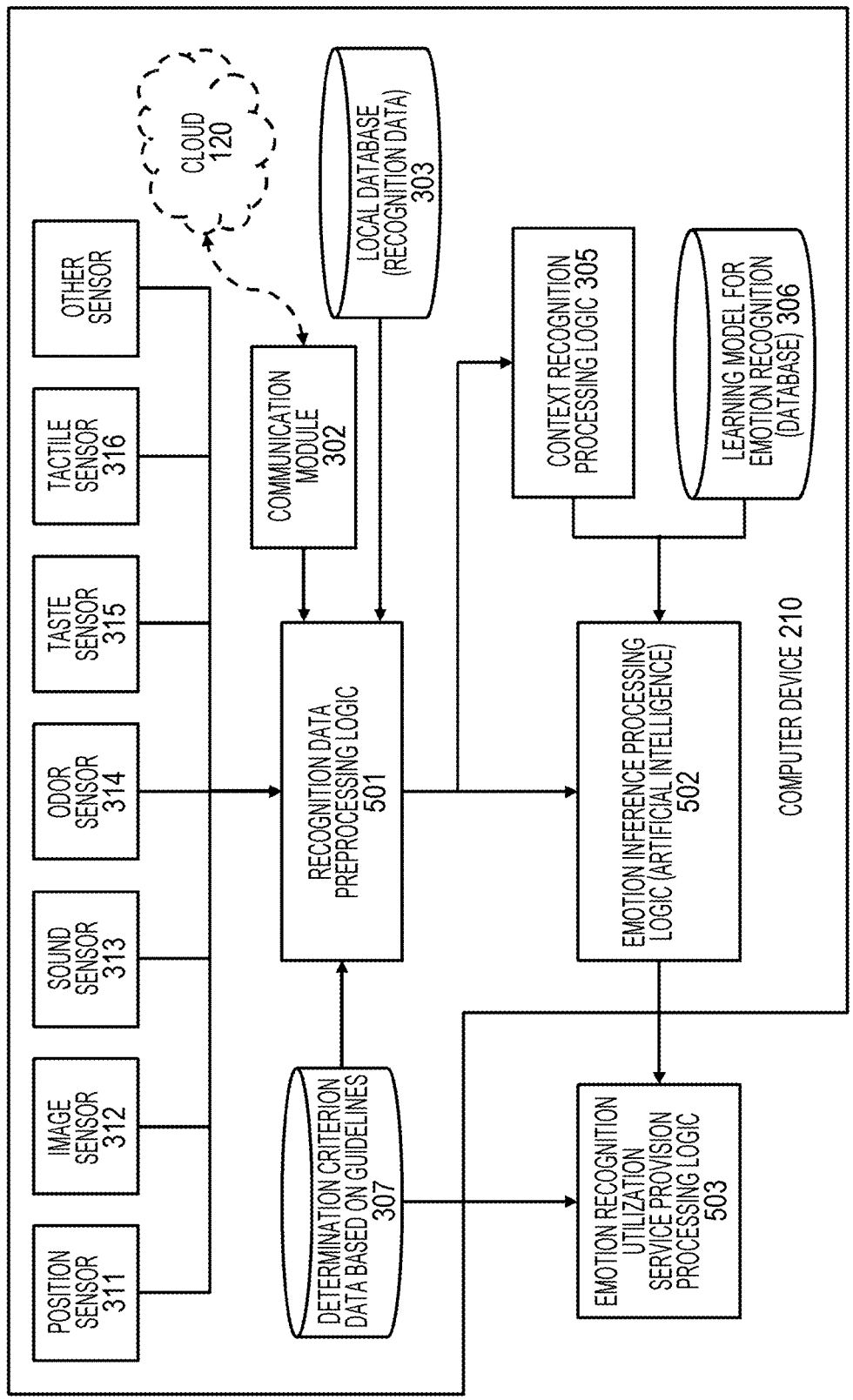
FIG. 5 is a diagram illustrating a functional configuration in a case where the computer device 210 performs emotion recognition.

FIG. 5 illustrates a functional configuration in a case where the computer device 210 to which the technology according to the present disclosure is applied performs emotion recognition together with a schematic flow of processing. However, the same components as those illustrated in FIG. 3 are denoted by the same reference numerals.

As similar to this, in a case where emotion recognition is performed from the facial expression of the human using the learned artificial intelligence function, the computer device 210 inputs image data acquired by the image sensor to the learned artificial intelligence, thereby causing the artificial intelligence function to recognize the human emotion.

The output data format from a sensor will vary depending on the type of sensor (as described above). In the configuration example illustrated in FIG. 5, a recognition data preprocessing logic 501 performs conversion processing before input of converting a data format of output data from each of the sensors into a data format that can be input to the artificial intelligence that performs the emotion recognition processing. The recognition data preprocessing logic 501 inputs the recognition data subjected to the conversion processing before input to each of an emotion inference processing logic 502 and the context recognition processing logic 305.

The recognition data of the artificial intelligence function may be received from the outside via the communication module 302 instead of being acquired from the sensor described above mounted on the computer device 210, or learning data read from the local database 303 in the computer device 210 may be used.

The emotion inference processing logic 502 has an artificial intelligence function. Note that it is desirable that, for the input to the emotion inference processing logic 502, the output from the context recognition processing logic 305 and the output from the recognition data preprocessing logic 501 are synchronously input such that the relevance between the context to be recognized and the RAW data from each of the sensors 311 to 316 . . . is learned.

Note that guidelines may be provided that the data to be provided to the emotion inference processing logic 502 should satisfy. Then, the recognition data preprocessing logic 501 may use determination criterion data 307 based on the guidelines to check whether or not recognition data to be input to the emotion inference processing logic 502 is appropriate from the viewpoint of ethics or the like.

The emotion inference processing logic 502 includes, for example, artificial intelligence such as CNN, DNN, RNN, reinforcement learning neural network, autoencoder, SNN, or SVM. The artificial intelligence function of the emotion inference processing logic 502 is applied with the learned emotion recognition model read from the database 306 and infers a human emotion from the recognition data input via the recognition data preprocessing logic 501. The database 306 may be local storage in the computer device 210 or may be storage on the cloud infrastructure 120 (see FIG. 1). Then, the emotion inference processing logic 502 outputs the human emotion inferred from the recognition data to an emotion recognition utilization service provision processing logic 503.

The emotion recognition utilization service provision processing logic 503 provides a service adapted to a human emotion or recommends a product or the like on the basis of the human emotion estimated by the emotion inference processing logic 502. The emotion recognition utilization service provision processing logic 503 may provide a service or recommend a product or the like after checking whether or not recommendation of a service, a product, or the like using emotion recognition is appropriate from the viewpoint of ethics or the like by using the determination criterion data 307 based on the above-described guidelines.

Figure 6:
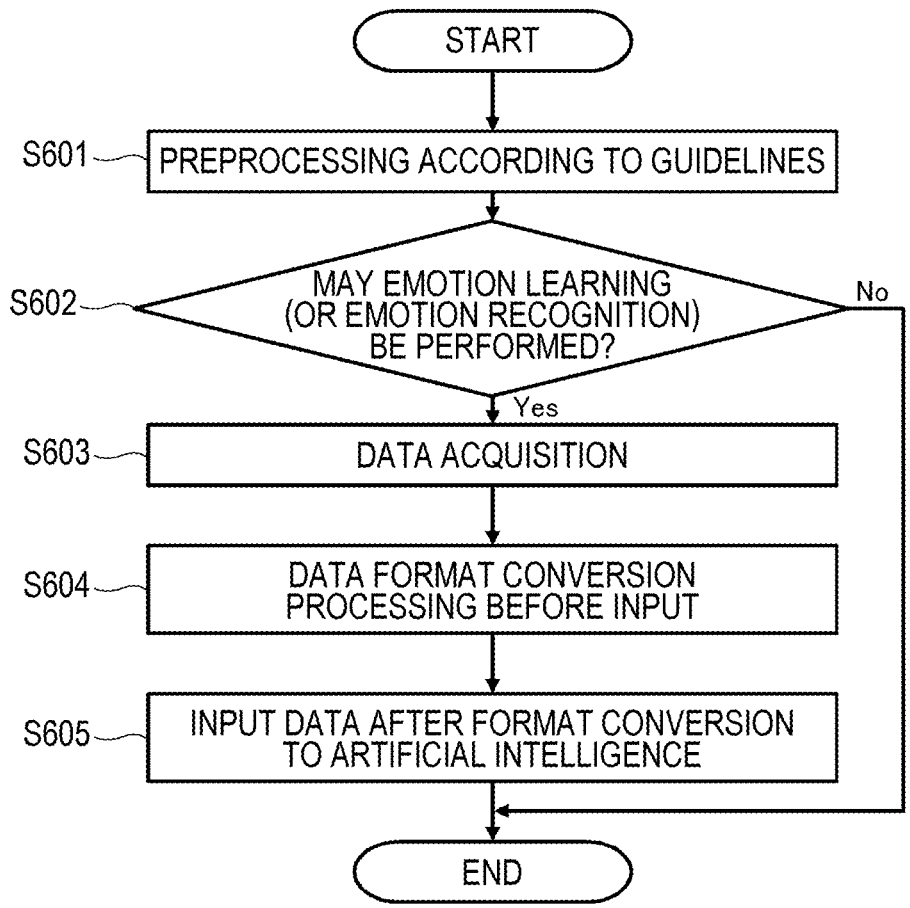
FIG. 6 is a flowchart illustrating a procedure of preprocessing learning data or recognition data.

FIG. 6 illustrates a procedure of preprocessing performed on learning data or recognition data input to the artificial intelligence for training or emotion recognition by the learning data preprocessing logic 301 in FIG. 3 and the recognition data preprocessing logic 501 in FIG. 5 in the form of flowchart.

First, in the learning data preprocessing logic 301 or the recognition data preprocessing logic 501, preprocessing according to the guidelines is performed (step S601). This preprocessing is not necessarily performed every time, and may be performed only for the first time. That is, this processing may be started from step S603 for the second and subsequent times. Details of the guidelines will be described later. Then, the learning data preprocessing logic 301 or the recognition data preprocessing logic 501 determines whether emotion learning by artificial intelligence or emotion recognition by artificial intelligence may be performed using the determination criterion data 307 based on the guidelines (step S602).

In a case where it is determined that the emotion learning by the artificial intelligence cannot be performed or the emotion recognition by the artificial intelligence cannot be performed according to the determination criterion data 307 based on the guidelines (No in step S602), all the subsequent processing steps are skipped, and the learning data preprocessing or the recognition data preprocessing ends.

Furthermore, in a case where it is determined that emotion learning of artificial intelligence may be performed or emotion recognition by artificial intelligence may be performed based on the determination criterion data 307 based on the guidelines (Yes in step S602), the learning data preprocessing logic 301 or the recognition data preprocessing logic 501 acquires learning data or recognition data from various sensors mounted on the computer device 210, the local database 303 in the computer device 210, or the cloud infrastructure 120 (step S603).

Conversion processing before input is performed by the learning data preprocessing logic 301 for converting the data format of the acquired learning data into a data format that can be input to the artificial intelligence that performs the emotion learning processing, and by the recognition data preprocessing logic 501 for converting the data format of the output data from each sensor into the data format that can be input to the artificial intelligence that performs the emotion recognition processing (step S604).

Then, the learning data preprocessing logic 301 inputs the format-converted data to the artificial intelligence that performs the emotion learning processing, the recognition data preprocessing logic 501 inputs the format-converted data to the artificial intelligence that performs the emotion recognition processing (step S605), and the processing ends.

For example, the data format of the image data acquired from the image sensor 312 may be an RGB format or a YUV format. Furthermore, pieces of image data (alternatively, various types of other sensor data) acquired from the local database 303 or the cloud infrastructure 120 may have different formats. The learning data preprocessing logic 301 and the recognition data preprocessing logic 501 perform preprocessing of converting sensor data of various data formats into a predetermined format assumed by the artificial intelligence, and then input the sensor data to the artificial intelligence.

Figure 7:
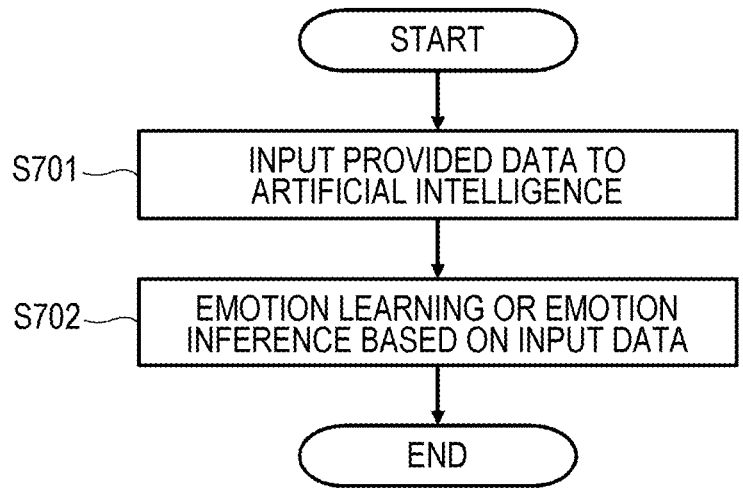
FIG. 7 is a flowchart illustrating a processing procedure for performing emotion learning by artificial intelligence or emotion inference by artificial intelligence.

FIG. 7 illustrates a procedure of the emotion learning processing of the artificial intelligence used in the emotion learning processing logic 304 in FIG. 3 and the emotion recognition processing by the artificial intelligence used in the emotion inference processing logic 502 in FIG. 5 in the form of flowchart.

The emotion learning processing logic 304 inputs the data preprocessed by the learning data preprocessing logic 301 and the emotion inference processing logic 502 inputs the data preprocessed by the recognition data preprocessing logic 501 to the artificial intelligence represented by the neural network (step S701). Here, in a case of the inference processing, as described with reference to FIG. 4, direct data input from the sensor and data input from the context recognition processing logic 305 are also performed.

Then, through training (for example, deep learning) by inputting data to the artificial intelligence in preceding step S701, the emotion learning processing logic 304 performs learning of the artificial intelligence for emotion recognition to manufacture new learning model for emotion recognition different from the model before training (that is, perform training of the learning model) (step S702). In learning of the artificial intelligence, training of the neural network is performed using a method such as back propagation. Then, the manufactured learning model for emotion recognition is stored in a database 306.

Furthermore, the emotion inference processing logic 502 performs emotion inference processing of inferring a human emotion from the input data using the artificial intelligence to which the learned emotion recognition model read from the database 306 is applied (step S702). Then, the inferred human emotion is output to the emotion recognition utilization service provision processing logic 503, and as a result, service provision or recommendation of product and the like is performed.

Figure 8:
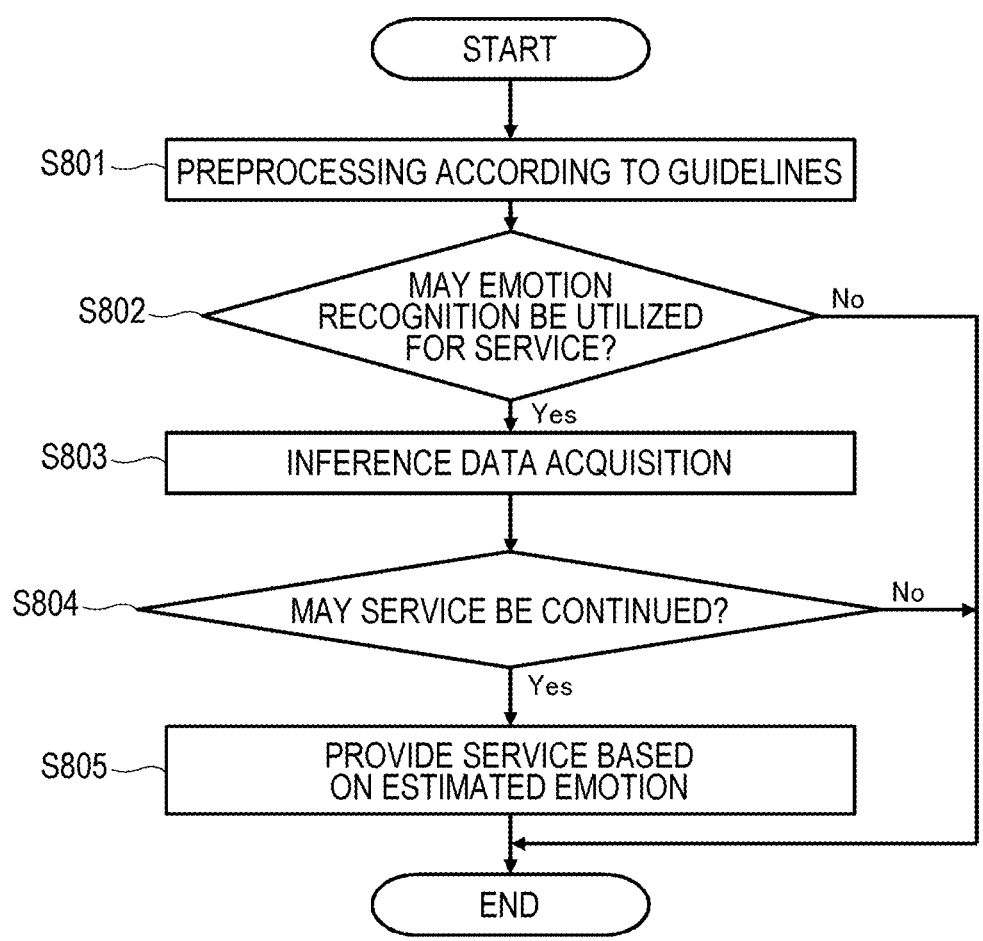
FIG. 8 is a flowchart illustrating a processing procedure for providing a service on the basis of an emotion inference result.

FIG. 8 illustrates a processing procedure for providing a service on the basis of the inferred emotion, which is performed in the emotion recognition utilization service provision processing logic 503, in the form of a flowchart.

First, the emotion recognition utilization service provision processing logic 503 performs preprocessing according to the guidelines (step S801). This preprocessing is not necessarily performed every time, and may be performed only for the first time. Moreover, in a case where the recognition data preprocessing logic 501 in the preprocessing illustrated in FIG. 6 and the emotion inference processing logic 502 in the emotion recognition processing illustrated in FIG. 7 store the fact or result that the already-performed preprocessing according to the guidelines, and this can be considered that the processing of step S801 has already been performed, the processing of step S801 may be omitted, and the processing may directly proceed to processing of reading inference data output from the artificial intelligence of the emotion inference processing logic 502.

In a case where the emotion recognition cannot be utilized for the service due to the determination criterion data 307 based on the guidelines (No in step S802), the emotion recognition utilization service provision processing logic 503 skips all the subsequent processing steps and ends the service provision processing based on the emotion recognition.

Furthermore, in a case where emotion recognition can be utilized for the service due to the determination criterion data 307 based on the guidelines (Yes in step S802), the emotion recognition utilization service provision processing logic 503 inputs data inferred from the recognition data by the emotion inference processing logic 502 (step S803).

Next, the emotion recognition utilization service provision processing logic 503 determines whether or not to continue the service provision processing on the basis of the data inferred by the emotion inference processing logic 502, that is, the emotion data (step S804).

In a case where the emotion recognition utilization service provision processing logic 503 determines that the service provision processing cannot be continued (No in step S804), the service provision processing based on the emotion recognition ends. For example, in a case where an emotion of "anger" is recognized by the emotion inference processing logic 502, there is a possibility that some uncomfortable situation has occurred in the user as a result of the emotion recognition processing performed so far. In such a case, the emotion recognition utilization service provision processing logic 503 determines that the service provision processing cannot be continued, and the service provision processing based on the emotion recognition ends.

On the other hand, in a case where the emotion recognition utilization service provision processing logic 503 determines that the service provision processing can be continued (Yes in step S804), the emotion recognition utilization service provision processing logic 503 provides the service based on the emotion estimated by the emotion inference processing logic 502 to the user (step S805), and the processing ends. For example, in a case where an emotion of "surprise" is recognized by the emotion inference processing logic 502, the emotion recognition utilization service provision processing logic 503 can perform an action or operation such as "inquiring to the user whether or not there is a problem" using an actuator or the like.

By performing processing of providing a service or recommending a product or the like suitable for the estimated emotion to the user, the emotion recognition service can be made as effective as possible for a human. On the other hand, in a case where the user feels uncomfortable or inconvenient, the emotion recognition service can be immediately stopped. Therefore, a more friendly emotion recognition utilization service can be provided through the computer device 210.

B-3. Emotion Recognition Utilization Service (2)

Figure 9:
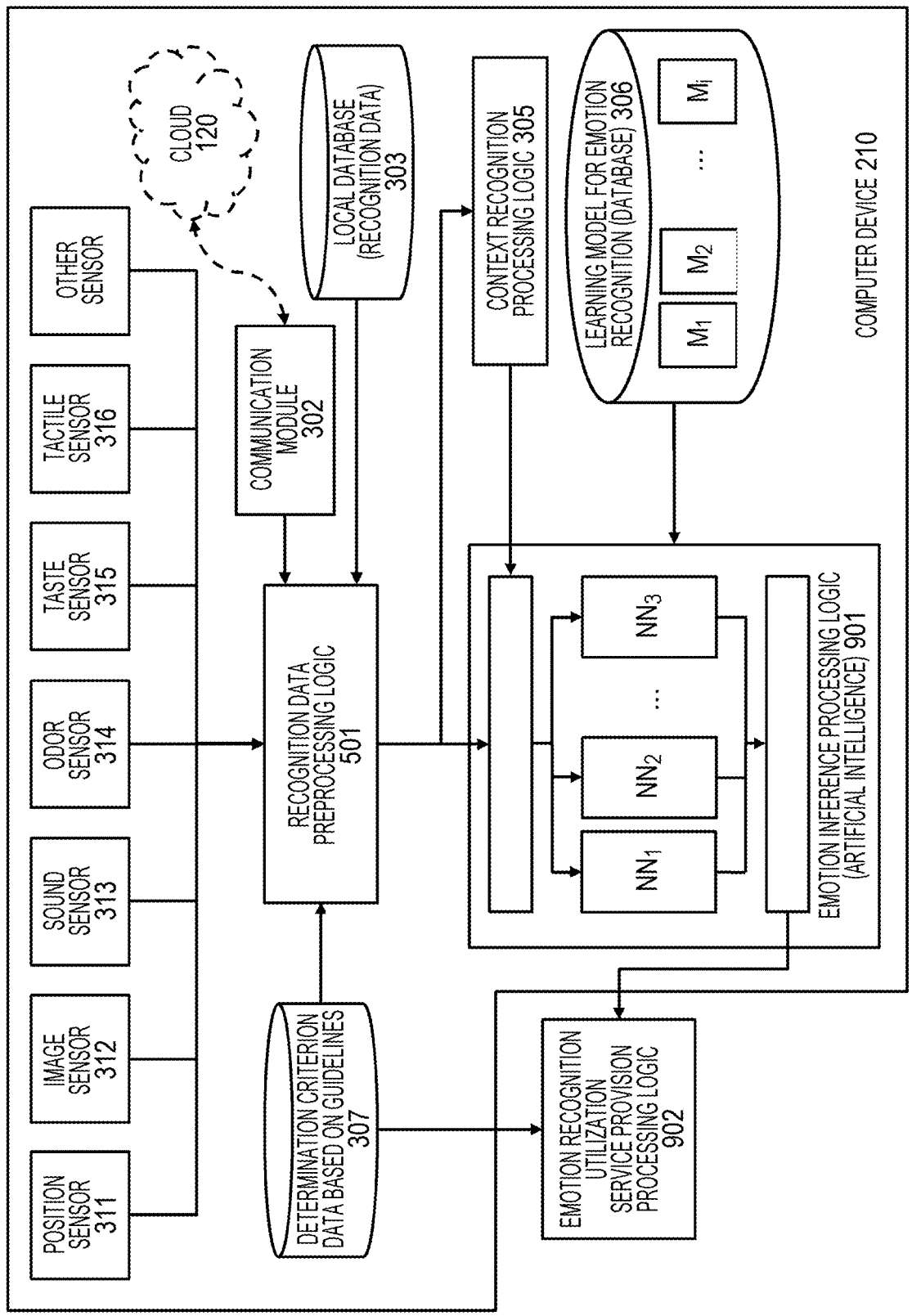
FIG. 9 is a diagram illustrating a functional configuration in a case where the computer device 210 performs emotion recognition.

FIG. 9 illustrates a functional configuration in a case where the computer device 210 to which the technology according to the present disclosure is applied has a plurality of artificial intelligence functions that perform emotion understanding and performs emotion recognition together with a schematic flow of processing. However, the same components as those illustrated in FIGS. 3 and 5 are denoted by the same reference numerals.

The computer device 210 inputs image data acquired by the image sensor to the learned artificial intelligence, thereby causing the artificial intelligence function to recognize the human emotion. Since the formats of the output data from the sensor are different depending on the type of the sensor, the recognition data preprocessing logic 501 performs conversion processing before input of converting a data format of output data from each of the sensors into a data format that can be input to the artificial intelligence that performs the emotion recognition processing. The recognition data preprocessing logic 501 inputs the recognition data subjected to the conversion processing before input to each of an emotion inference processing logic 901 and the context recognition processing logic 305. The recognition data of the artificial intelligence function may be received from the outside via the communication module 302 instead of being acquired from the sensor described above mounted on the computer device 210, or learning data read from the local database 303 in the computer device 210 may be used.

The emotion inference processing logic 901 has a plurality of artificial intelligence functions. In the illustrated example, it is assumed that each artificial intelligence function includes a model of a neural network (NN), and the emotion inference processing logic 901 includes i neural networks $NN_1$, $NN_2$, . . . , $NN_i$. Each of the neural networks $NN_1$, $NN_2$, . . . , $NN_i$ includes, for example, artificial intelligence such as CNN, DNN, RNN, reinforcement learning neural network, autoencoder, SNN, or SVM. The learned emotion recognition models $M_1$, $M_2$, . . . , $M_i$ read from the database 306 are respectively applied to the neural networks $NN_1$, $NN_2$, . . . , $NN_i$ in the emotion inference processing logic 502, and infer human emotions from the recognition data input via the recognition data preprocessing logic 501. The database 306 may be local storage in the computer device 210 or may be storage on the cloud infrastructure 120 (see FIG. 1). Then, the emotion inference processing logic 901 outputs the human emotion inferred from the recognition data to an emotion recognition utilization service provision processing logic 902.

Here, each of the neural networks $NN_1$, $NN_2$, . . . , $NN_i$ is a neural network that similarly recognizes human emotions by using the learned emotion recognition models $M_1$, $M_2$, . . . , $M_i$ trained in different situations using different pieces of learning data, different loss functions, or the like, but it is assumed that different recognition results are output according to a combination of various pieces of recognition data input at the time of use. Therefore, the emotion inference processing logic 901 can improve the recognition accuracy of human emotions by comprehensively combining inference results from a plurality of neural networks $NN_1$, $NN_2$, . . . , $NN_i$.

The emotion recognition utilization service provision processing logic 902 provides a service adapted to a human emotion or recommends a product or the like on the basis of the human emotion estimated by the emotion inference processing logic 901. The emotion recognition utilization service provision processing logic 503 may provide a service or recommend a product or the like after checking whether or not recommendation of a service, a product, or the like using emotion recognition is appropriate from the viewpoint of ethics or the like by using the determination criterion data 307 based on the above-described guidelines. If the emotion recognition accuracy by the emotion inference processing logic 901 is improved, the emotion recognition utilization service provision processing logic 902 can provide the emotion recognition utilization service with a high user satisfaction level by that amount.

Figure 10:
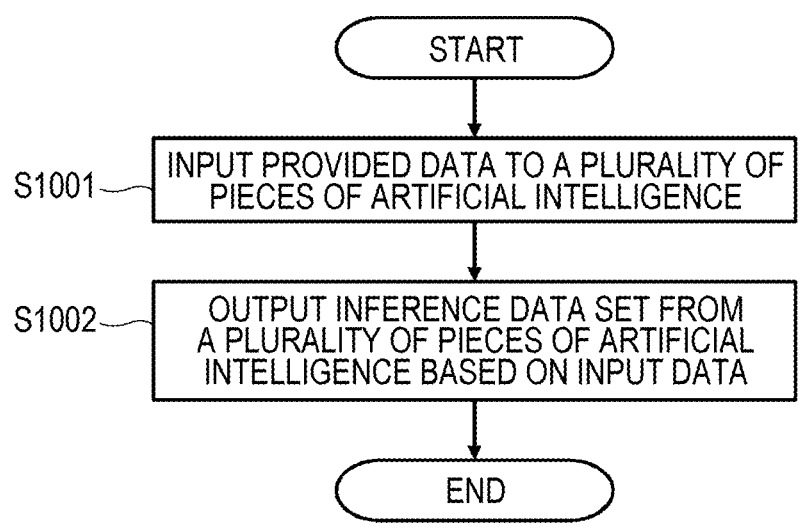
FIG. 10 is a flowchart illustrating a processing procedure for performing emotion inference by artificial intelligence.

FIG. 10 illustrates a procedure of the emotion recognition processing by the emotion inference processing logic 901 including a plurality of artificial intelligence functions in FIG. 9 in the form of a flowchart.

The emotion inference processing logic 901 inputs the data preprocessed by the recognition data preprocessing logic 501 to each of the neural networks $NN_1$, $NN_2$, . . . , $NN_i$ (step S1001). Furthermore, as described with reference to FIG. 4, direct data input from the sensor and data input from the context recognition processing logic 305 are also performed.

The learned emotion recognition models $M_1$, $M_2$, . . . , $M_i$ read from the database 306 are respectively applied to the neural networks $NN_1$, $NN_2$, . . . , $NN_i$ and infer human emotions from the recognition data input via the recognition data preprocessing logic 501. Then, the emotion inference processing logic 901 outputs a set of inference results from the plurality of neural networks $NN_1$, $NN_2$, . . . , $NN_i$ as an inference data set such that the sets can be individually recognized (for example, by imparting an ID of each neural network) (step S1002). Then, the inferred human emotion is output to the emotion recognition utilization service provision processing logic 902, and service provision or recommendation of product and the like is performed.

Figure 11:
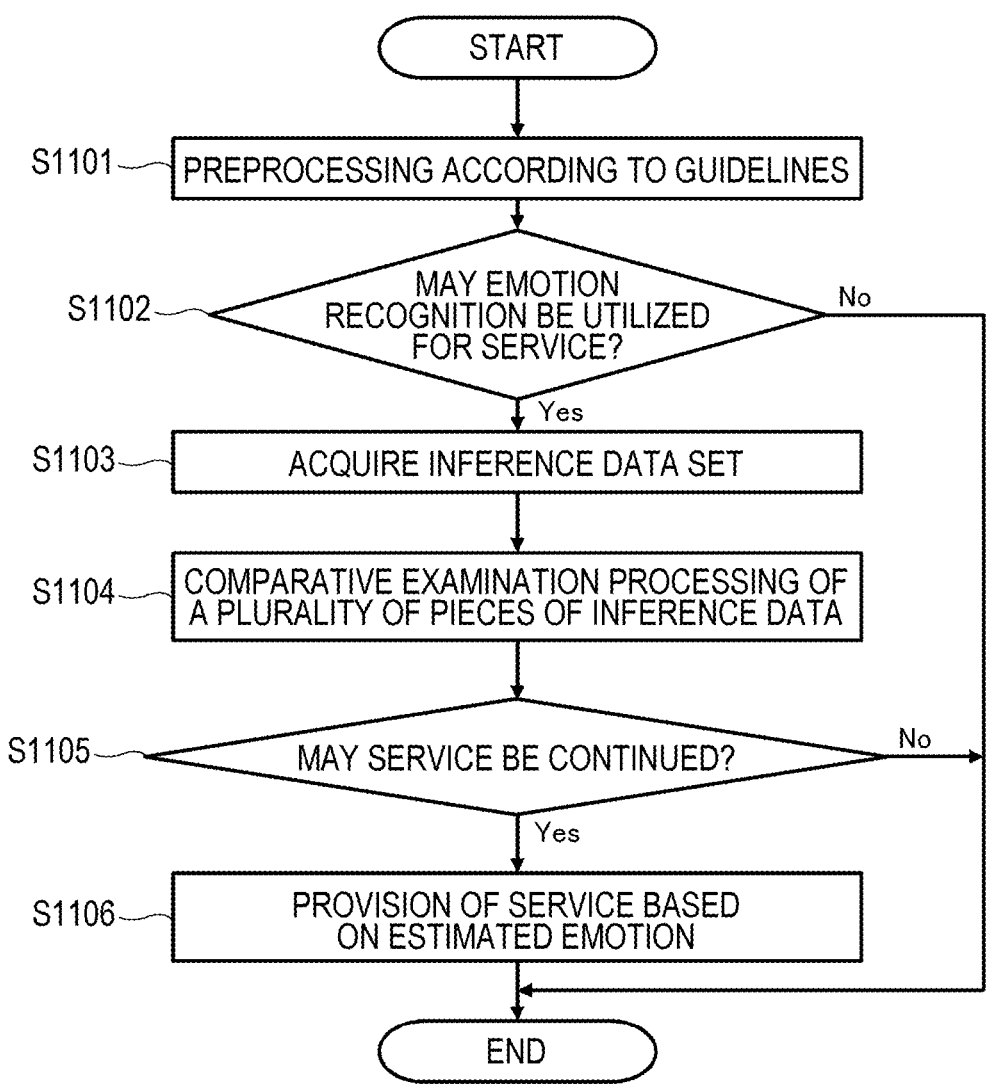
FIG. 11 is a flowchart illustrating a processing procedure for providing a service on the basis of an inferred emotion.

FIG. 11 illustrates a processing procedure for providing a service on the basis of the inferred emotion, which is performed in the emotion recognition utilization service provision processing logic 902, in the form of a flowchart.

First, the emotion recognition utilization service provision processing logic 902 performs preprocessing according to the guidelines (step S1101). This preprocessing is not necessarily performed every time, and may be performed only for the first time. Moreover, in a case where the recognition data preprocessing logic 501 in the preprocessing illustrated in FIG. 6 and the emotion inference processing logic 901 in the emotion recognition processing illustrated in FIG. 7 store the fact or result that the already-performed preprocessing according to the guidelines, and this can be considered that the processing of step S1101 has already been performed, the processing of step S1101 may be omitted, and the processing may directly proceed to processing of reading the inference data set output from the artificial intelligence of the emotion inference processing logic 901.

In a case where the emotion recognition cannot be utilized for the service due to the determination criterion data 307 based on the guidelines (No in step S1102), the emotion recognition utilization service provision processing logic 902 skips all the subsequent processing steps and ends the service provision processing based on the emotion recognition.

Furthermore, in a case where emotion recognition can be utilized for the service due to the determination criterion data 307 based on the guidelines (Yes in step S1102), the emotion recognition utilization service provision processing logic 902 inputs an inference data set obtained by the plurality of neural networks $NN_1$, $NN_2$, . . . , $NN_i$ in the emotion inference processing logic 901 inferring from the recognition data (step S1103).

Then, the emotion recognition utilization service provision processing logic 902 performs comparative examination processing on the inference data of each of the neural networks $NN_1$, $NN_2$, . . . , $NN_i$ (step S1104).

As an example of the comparative examination processing, the emotion recognition utilization service provision processing logic 902 statistically processes a plurality of pieces of inference data and adopts the inference data with the highest probability as a result of emotion recognition for the user. As another example, the recognition utilization service provision processing logic 902 stores emotion inference data in time series, and adopts the inference data with the highest probability as a result of emotion recognition for the user in a transition network between emotions defined in advance. For example, in a case where the emotion of user estimated immediately before is "anger", the inference data output from one neural network suggests "happiness", and the inference data output from another neural network is "sadness", the transition with the transition probability is defined as "anger" to (transition probability P1) to "happiness", "anger" to (transition probability P2) to "sadness", and P1<P2 is defined, so that "sadness" can be regarded as the inference data with the highest probability. The transition relationship between these emotions may also be determined by another artificial intelligence using a model of the artificial intelligence learned in advance. Furthermore, a quantum computer that implements parallel processing using quantum mechanics may be used for processing of estimating a subsequent emotion from an emotion of user estimated immediately before.

Next, the emotion recognition utilization service provision processing logic 902 determines whether or not to continue the service provision processing on the basis of the emotion recognized by the inference data set (step S1105). For example, in a case where an emotion of "anger" is recognized, there is a possibility that some uncomfortable situation has occurred in the user as a result of the emotion recognition processing performed so far. In such a case, the emotion recognition utilization service provision processing logic 902 determines that the service provision processing cannot be continued, and the service provision processing based on the emotion recognition ends.

On the other hand, in a case where the emotion recognition utilization service provision processing logic 902 determines that the service provision processing can be continued (Yes in step S1105), the emotion recognition utilization service provision processing logic 902 provides the service based on the emotion estimated from the inference data set to the user (step S1106), and the processing ends. For example, in a case where an emotion of "surprise" is recognized, the emotion recognition utilization service provision processing logic 902 can perform an action or operation such as "inquiring to the user whether or not there is a problem" using an actuator or the like.

By performing processing of providing a service or recommending a product or the like suitable for the estimated emotion to the user, the emotion recognition service can be made as effective as possible for a human. On the other hand, in a case where the user feels uncomfortable or inconvenient, the emotion recognition service can be immediately stopped. Therefore, a more friendly emotion recognition utilization service can be provided through the computer device 210.

C. Control According to Guidelines

Figure 12:
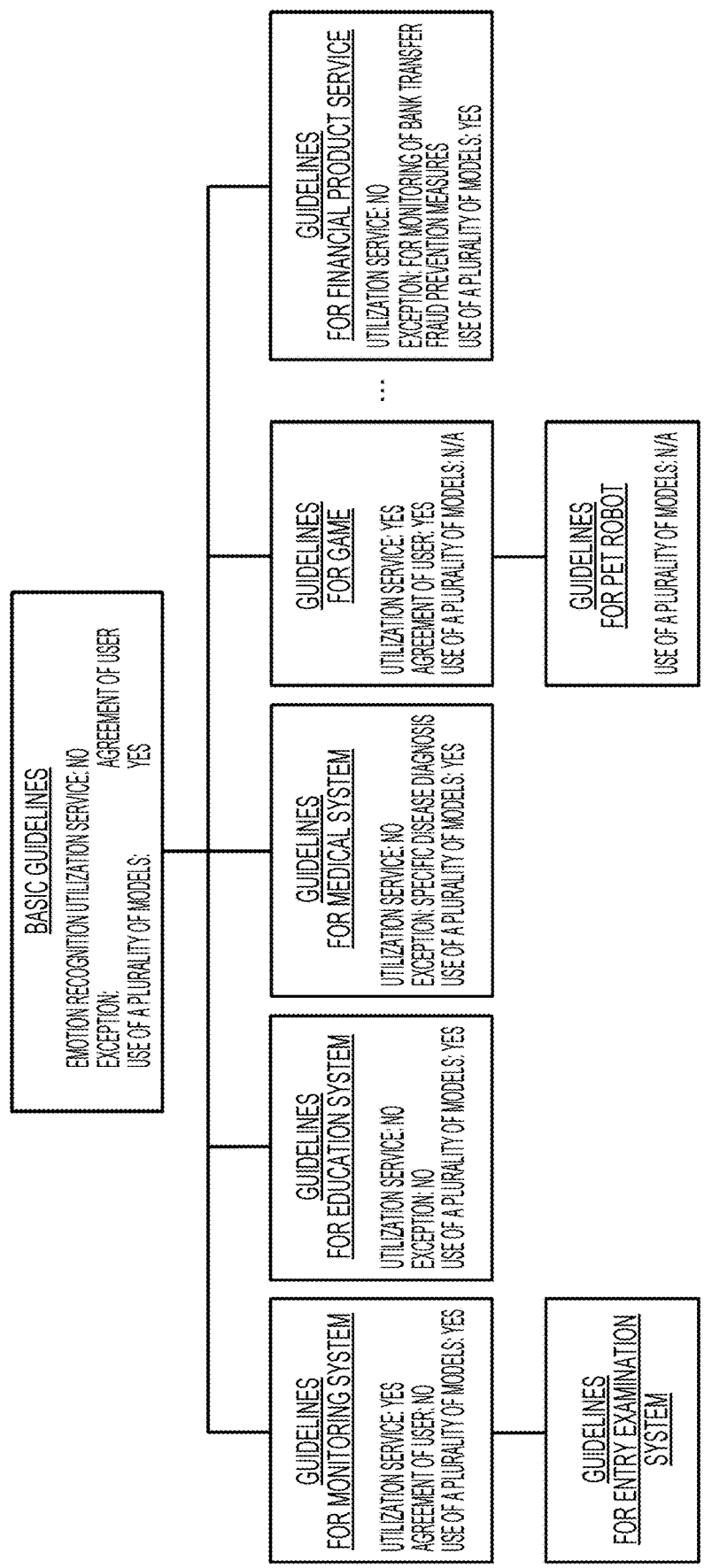
FIG. 12 is a diagram illustrating a data structure of guidelines.

FIG. 12 illustrates a data structure of the guidelines. The illustrated guidelines can be applied to preprocessing of learning data and recognition data, emotion learning processing, and emotion recognition determination service provision processing. The determination criterion data 307 based on the guidelines as described above includes a data structure illustrated in FIG. 12, and is managed on local storage in the computer device 210 or on cloud storage. Furthermore, the emotion recognition utilization service provision processing logic 503 or 902 determines the appropriateness/inappropriateness of utilizing emotion recognition for a service with reference to guidelines as illustrated in FIG. 12.

In FIG. 12, basic guidelines that define the principle are arranged at the root, and it is shown that a hierarchical class structure can be taken according to the application. In the guidelines of each class, the parameters common particularly in relation to the present embodiment are at least the following four.

(1) Emotion recognition utilization service
(2) Exception
(3) Agreement of user
(4) Use of a plurality of models The first "emotion recognition utilization service" is a parameter that defines whether or not emotion recognition can be used for a service. The "emotion recognition utilization service" parameter may be a fixed constant or a variable that can be arbitrarily changed (hereinafter, the same applies to other parameters).

The second "exception" is a parameter provided for defining an exception in a case where the "emotion recognition utilization service" parameter is "NO". In principle, in a case where the parameter of the "emotion recognition utilization service" is "NO" in the guidelines, the emotion recognition utilization service is not permitted, but an exceptional condition under which emotion recognition may be utilized in the service can be specified by the parameter of "exception". For example, in a case where "agreement of user" is specified as the exceptional condition, even in a case where the parameter of the "emotion recognition utilization service" is "NO", it means that the user is requested to agreement and the utilization of the emotion recognition is permitted to the service if the user agrees. Examples of the other exceptional conditions include a condition on whether it is "specific disease diagnosis" and a condition on whether it is "for monitoring of bank transfer fraud prevention measures". The "exception" parameter can optionally be defined as necessary.

The third "agreement of user" is a parameter that specifies whether or not agreement of the user is necessary when control against the specification of the "emotion recognition utilization service" parameter is performed. In a case where the "agreement of user" parameter is "YES", it indicates that the agreement of the user is necessary, and in a case where the parameter is "NO", it indicates that the agreement of the user is unnecessary.

The fourth "use of a plurality of models" is a parameter indicating whether or not it is necessary to recognize emotions by comprehensively determining outputs of a plurality of pieces of artificial intelligence (for example, neural network models) that can perform independent learning and inference in a case where emotion recognition can be utilized for a service. For the configuration and operation of the system that comprehensively determines the outputs of the plurality of pieces of artificial intelligence, refer to FIGS. 9 to 11.

In the example illustrated in FIG. 12, the parameters of the "basic guidelines" that is the root class are specified as "emotion recognition utilization service"="NO", "exception"="agreement of user", and "use of a plurality of models"="YES".

First, "emotion recognition utilization service"="NO" is specified. Accordingly, the emotion recognition utilization service provision processing logic 503 or 902 instructs control to prohibit, in principle, utilization of emotion recognition for a service. On the other hand, "exception"="agreement of user" is specified. Accordingly, the emotion recognition utilization service provision processing logic 503 or 902 permits utilization of emotion recognition for a service in a case where processing for obtaining agreement of the user through the user interface 213 or the like is performed. Specifically, the computer device 210 performs an inquiry using voice guidance from the speaker 107 or a character or an image on the display 106, and performs processing for obtaining the agreement of the user.

In a case where the computer device 210 does not include a user interface for making an inquiry to the user although the guidelines require "agreement of user"="YES", that is, obtaining the agreement of the user is requested, it may be configured such that the user is notified that processing cannot be performed as a system error, or processing may be simply continued considering that "exception" is not allowed. By providing the parameter "exception" in this manner, it is possible to request the agreement of the user in a case where the artificial intelligence system 200 including the service control mechanism of the emotion learning and the emotion inference is used. Therefore, a service provider using the artificial intelligence system 200 can obtain an informed consent of the user based on the notification in advance. As a result, it is possible to provide an emotion recognition utilization service that is considered to be useful for the user without giving uncomfortable feeling or distrust to the user.

A subclass of the "basic guidelines" can be defined according to an application field of the emotion recognition utilization service or the like. In the data structure of the guidelines illustrated in FIG. 12, data structures of "guidelines for monitoring system", "guidelines for education system", "guidelines for medical system", "guidelines for game", . . . , "guidelines for financial product service" are defined as subclasses of "basic guidelines", a data structure of "guidelines for entry examination system" is defined as a subclass of "guidelines for monitoring system", and a data structure of "guidelines for pet robot" is defined as a subclass of "guidelines for game". Hereinafter, the data structure of each subclass will be described.

The guidelines for emotion system specifies that "emotion recognition utilization service"="YES" and "agreement of user"="NO", that is, the emotion recognition utilization service may be used in the monitoring system, and that it is not necessary to obtain the agreement of the user. This is because, in the monitoring system, it is necessary to perform image recognition of a target human, recognize an emotion from an expression, and utilize the emotion for a service, but from the public nature of the service of monitoring, it is considered that the emotion recognition should be used for the service even without agreement of the user. Furthermore, since a high degree of "fairness" is required from the public nature of the service of monitoring such that a human emotion is not recognized by erroneous determination, "use of a plurality of models"="YES", that is, it is required to recognize a human emotion with high accuracy by comprehensively determining outputs of a plurality of pieces of artificial intelligence. Moreover, the "guidelines for entry examination system", which is a subclass of the "guidelines for monitoring system", has different applications, but the nature of the service is not different from the "guidelines for monitoring system", which is a higher class (similarly, public nature is required). Therefore, setting of different parameters is not defined in the definitions.

A characteristic feature in the guidelines for education system is that "emotion recognition utilization service"="NO" and "exception"="NO" are specified, that is, the emotion recognition utilization service is prohibited without an exception. As a result, in a case where an artificial intelligence system having an emotion recognition function is introduced into an education site, it is possible to prevent a problem from occurring due to permission or non-permission of recognizing the emotion from the expression of a child by the judgment at the site.

In the guidelines for medical system, "emotion recognition utilization service"="NO", "exception"="specific disease diagnosis" are specified, that is, the emotion recognition utilization service is prohibited in principle, but the use of emotion recognition for a service is permitted with the exceptional condition of specific disease diagnosis. For example, in the diagnosis of "personality disorder", a doctor may find emotion recognition useful. In a case where the emotion recognition is found to be useful in the treatment of a disease, control by making such an exception to guidelines will work.

As similar to this, in the guidelines for financial product service, "emotion recognition utilization service"="NO" is specified, that is, while the emotion recognition utilization service is prohibited in principle, "exception"="for monitoring of bank transfer fraud prevention measures" is defined. In a financial institution such as a bank, it is beneficial to take measures to prevent customers from experiencing transfer fraud. In a case where an emotion such as "fear" is recognized from an expression when a person performs a transfer operation, it is possible to predict that the person has hesitation in transfer by using the emotion recognition utilization service, and to take transfer fraud prevention measures such as a person in charge asking a customer or uttering a voice or displaying a message to call attention to the customer.

In the guidelines for game, "emotion recognition utilization service"="YES" and "agreement of user"="YES" are specified, that is, it is defined that emotion recognition may be used for a game in the game, but it is defined to request agreement of the user. The content of the guideline is in accordance with a custom that is necessary in a predetermined case to ask the user for agreement in advance in a game. On the other hand, from the entertainment aspect of a game, it is also an important element of the game that a character in the game makes an unexpected motion, and the accuracy of emotion recognition may not be so emphasized. For this reason, "use of a plurality of models"="N/A" is specified, that is, it is defined that it is not necessary to comprehensively determine the outputs of a plurality of pieces of artificial intelligence.

For example, a technology has been developed in which an ear hole open type headphone and a technique of a head related transfer function (HRTF) are combined to localize a sound image of a voice of an agent or the like artificially generated at the same time as an external sound to an arbitrary position in a three-dimensional space around the head of the user. The emotion recognition utilization service can be performed on the user who plays the game using such headphones according to the guidelines for game as described above. Although there is a possibility that the accuracy of emotion recognition is lower than in a case where a plurality of models is used, when sound image localization is performed such that an agent of a character wobbles around the head of the user, it is also conceivable that an operation of the character that is not appropriate for the recognized emotion of the user is performed in order to attract the attention of the user. Even in such a case, it is considered that the necessity of accurately recognizing the emotion of the user is relatively low.

On the other hand, in the guidelines for pet robot which is a subclass of the guidelines for game, since the "pet robot" has strong attribution to the user, it is highly necessary to recognize the emotion of the user more accurately, "use of a plurality of models"="YES" is specified, that is, it is required to recognize the human emotion with high accuracy by comprehensively determining the outputs of a plurality of pieces of artificial intelligence.

Note that the class hierarchy of the guideline illustrated in FIG. 12 is an example, and is not a fixed hierarchical structure suggesting a specific design. For example, it is also assumed that a subclass (not illustrated) is further included under the root class, or that a part or all of the illustrated subclass is not included, and that subclasses of two or more hierarchies are defined further under the subclass. Furthermore, the parameters of the guidelines of each class can also be arbitrarily changed.

Figure 13:
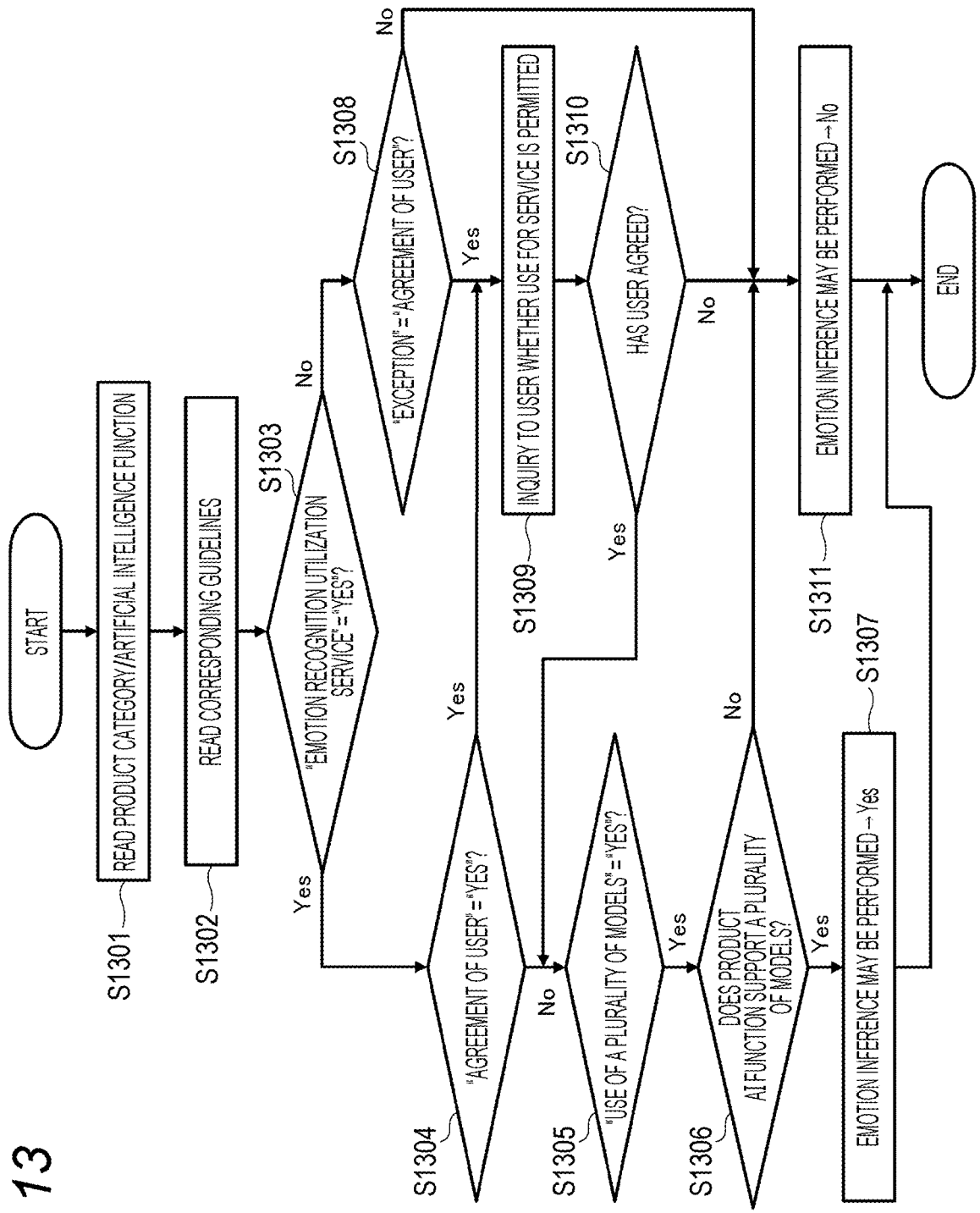
FIG. 13 is a flowchart illustrating a procedure of preprocessing according to the guidelines.

FIG. 13 illustrates a procedure of preprocessing according to the guidelines in the form of a flowchart. The illustrated processing procedure is performed by the learning data preprocessing logic 301, the recognition data preprocessing logic 501, and the like in step S601 in FIG. 6, step S801 in FIG. 8, and step S1101 in FIG. 11.

First, a category of a product or a service of the computer device 210 to which the emotion recognition utilization service is to be provided, artificial intelligence function information as a product or a service, and the like are read (step S1301).

Next, the category of the product or service is designated, and the corresponding guideline information is read from the storage (step S1302). Here, it is assumed that the guideline information is hierarchically structured as illustrated in FIG. 12, but it is a matter of course that the guideline information may be managed in other structures. Furthermore, the guideline information is managed on a local storage in the computer device 210 or on cloud storage, and the preprocessing logic 301 or 501 reads the guideline information from the storage.

Next, in the guideline information read in step S1302, it is checked whether or not the parameter of the "emotion recognition utilization service" is "YES" by referring to each parameter defined in the class corresponding to the category of the product or service read in step S1301 (step S1303).

In a case where the parameter of the "emotion recognition utilization service" is "YES" (Yes in step S1303), it is subsequently checked whether or not the "agreement of user" parameter is "YES" (step S1304).

In a case where the "agreement of user" parameter is "YES", that is, in a case where the agreement of the user is necessary in performing control against the specification of the "emotion recognition utilization service" parameter (Yes in step S1304), processing of obtaining the agreement of the user through the user interface 213 or the like is performed (step S1309).

Furthermore, in a case where the parameter of the "emotion recognition utilization service" is "NO" (No in step S1303), it is checked whether or not "agreement of user" is specified in the parameter of "exception" (step S1308). Then, in a case where "agreement of user" is specified in the parameter of "exception" (Yes in step S1308), processing of obtaining the agreement of the user through the user interface 213 or the like is performed (step S1309).

Here, in a case where the parameter of the "emotion recognition utilization service" is "NO" and "agreement of user" is not specified in the parameter of "exception" (No in step S1308), and in a case where the agreement of the user on the use of the emotion recognition utilization service has not been obtained (No in step S1310), a state is set where emotion inference (learning, service) cannot be performed (alternatively, a state where a result of emotion recognition cannot be used to provide a service in a corresponding category) (step S1311), and the processing ends.

On the other hand, in a case where the "agreement of user" parameter is "NO", that is, in a case where the agreement of the user is not necessary in performing control against the specification of the "emotion recognition utilization service" parameter (No in step S1304), and in a case where the agreement of the user has been obtained on the use of the emotion recognition utilization service (Yes in step S1310), it is subsequently checked whether or not the parameter of the "use of a plurality of models" is "YES" is specified, that is, whether or not use of a plurality of pieces of artificial intelligence is specified (step S1305).

In a case where the parameter of the "use of a plurality of models" is "YES" (Yes in step S1305), the artificial intelligence function of the computer device 210 read in step S1301 is referred to, and whether or not to support a plurality of models is checked (step S1306). Here, in a case where a plurality of models is not supported (No in step S1306), there is a concern that the accuracy of the requested emotion recognition cannot be obtained. Therefore, a state is set where the emotion inference (learning, service) cannot be performed (step S1311), and the processing ends.

Furthermore, in a case where the parameter of the "use of a plurality of models" is "NO" (No in step S1305), and in a case where the parameter of the "use of a plurality of models" is "YES" and a plurality of models is supported (Yes in step S1306), a state where emotion inference (learning, service) can be performed (alternatively, a state where a result of emotion recognition can be used to provide a service in a corresponding category) is set (step S1307), and the processing ends.

D. User Interface of Emotion Recognition Service

FIG. 14 illustrates a configuration example of a user interface (UI) screen of an emotion recognition utilization service. An illustrated UI screen 1400 displays a face image 1401 of a person to be recognized in the left half of the screen, and shows an emotion recognition result 1402 in the right half of the screen. The face image 1401 displays the positions of the face parts (eyebrows, eyes, nose, mouth, cheeks, chin) specified by the image recognition in an overlapping manner. Furthermore, the emotion recognition result 1402 displays, on the radar chart, respective levels of six emotion labels of "anger", "disgust", "fear", "happiness", "sadness", and "surprise" recognized by the emotion inference processing logic 901 from the expression of the face image 1401.

In the preprocessing procedure according to the guidelines illustrated in FIG. 13, in a case where the "agreement of user" parameter is "YES" and in a case where the parameter of the "emotion recognition utilization service" is "NO" but "agreement of user" is specified in the parameter of "exception", processing for obtaining the agreement of the user is performed (as described above). Therefore, a message 1403 of "Q. Emotion recognition will be performed. OK?" for confirming the agreement of the user is displayed at the lower right of the UI screen 1400 illustrated in FIG. 14. Furthermore, in addition to the display of the message 1403, a voice message such as "Emotion recognition will be performed. OK?" may be uttered.

Then, when the user agrees by voice such as "Good" or indicates an intention to agree by using an operation of a touch panel, a keyboard, a mouse, or the like, preprocessing according to the guidelines proceeds. On the other hand, when the user gives an answer such as "No" indicating disagreement by voice or indicates intention not to agree by using an operation on a touch panel, a keyboard, a mouse, or the like, a state is set where emotion inference (learning, service) cannot be performed, and the preprocessing according to the guidelines ends.

Furthermore, even in a case where the user agrees to use the emotion recognition utilization service, there is a case where the user wants to inquire about the reason for reaching the conclusion of the emotion recognition. For example, there is a case where, after actually receiving the emotion recognition utilization service, the user has a question about the content of the service and wants to inquire how his/her emotion has been recognized. Furthermore, in a case where the user does not agree to use the emotion recognition utilization service, there is a case where the user wants to inquire about the reason for the emotion recognition result 1402 illustrated in the right half of the UI screen 1400. Therefore, the computer device 210 (alternatively, the artificial intelligence system 200) that performs the emotion recognition utilization service stores the input image from the image sensor 316 and the like and the information of the face parts used for the expression recognition together with the emotion recognition result by the emotion inference processing logic 901. In order to reduce the amount of data to be stored, it is possible to store only a few frames in the preceding and subsequent sections in which the emotion change is particularly large. Note that a blockchain technique may be used as a storage method. Specifically, by adding the hash data to the data, storing the data on the network, and searching using the hash data, appropriate data can be extracted and displayed on the UI screen 1400 according to the inquiry of the reason.

An expression of a face of a person may suddenly change. In preparation for this, by combining DVS data using a spiking neural network (SNN), differential changes can be easily grasped. Accordingly, the data recording described above may be performed at the time when the output of the DVS greatly changes.

E. Effects of Emotion Recognition Utilization Service

According to a technology according to the present disclosure, it is possible to provide an information processing apparatus that performs human emotion recognition at a necessary level on the basis of predetermined guidelines, and appropriately controls a level of emotion recognition through interaction with a human.

INDUSTRIAL APPLICABILITY

The technology according to the present disclosure has been described in detail with reference to specific embodiments. However, it is obvious that those skilled in the art can make modifications and substitutions of the embodiments without departing from the gist of the technology according to the present disclosure.

In the present specification, an embodiment applied to a system that performs human emotion recognition on the basis of a result of analyzing an expression from a face image has been mainly described, but the application range of the technology according to the present disclosure is not limited thereto. The technology according to the present disclosure can be similarly applied to a system that performs emotion recognition from a voice uttered by a human, a system that performs emotion recognition on the basis of biological information such as brain waves and pulse, and a system that performs emotion recognition from a combination of a plurality of pieces of sensor information.

The technology according to the present disclosure can be applied to control of an apparatus having an artificial intelligence function that performs emotion recognition in various fields including image recognition in a camera, image synthesis in a television, voice recognition in a headphone or the like, natural language understanding and document synthesis in a document processing system, and action recognition and action generation in an agent and a robot, and manufacturing of a computer program used in an apparatus.

In short, the technology according to the present disclosure has been described in the form of exemplification, and the contents of the description of the present specification should not be interpreted restrictively. In order to determine the gist of the technology according to the present disclosure, the scope of claims should be taken into consideration.

Note that the technology disclosed in the present specification may have the following configuration.

(1) An information processing apparatus including:
a preprocessing unit that determines whether or not to permit provision of a service based on emotion recognition on the basis of a predetermined criterion;
an emotion estimation processing unit that performs the emotion recognition for a user by using an artificial intelligence function; and
a service providing processing unit that provides a service based on an emotion recognition result by the emotion estimation processing unit,
in which, when the preprocessing unit determines to permit the provision of the service, the emotion estimation processing unit performs the emotion recognition or the service providing processing unit provides the service.

(1-1) The information processing apparatus according to in which the artificial intelligence function recognizes a human emotion from sensor information.

(1-2) The information processing apparatus according to in which the artificial intelligence function recognizes a human emotion from expression obtained by analyzing a face image of a user.

(2) The information processing apparatus according to (1),
in which, in a case where it is determined that agreement of the user is necessary based on the criterion, the preprocessing unit performs processing of requesting the user to agree to use the emotion recognition result for the service.

(3) The information processing apparatus according to (2),
in which the preprocessing unit permits use of the emotion recognition result for the service under an exceptional condition that the user agrees although it is determined that the emotion recognition result is not available for the service.

(4) The information processing apparatus according to any one of (1) to (3),
in which, the criterion includes data indicating that a plurality of artificial intelligence models is required, and
the preprocessing unit determines whether or not to permit the provision of the service based on whether or not the emotion estimation processing unit includes a plurality of artificial intelligence models in a case where the criterion includes the data.

(5) The information processing apparatus according to (4),
in which the emotion estimation processing unit performs inference using a plurality of artificial intelligence models, and outputs a set of inference results by each of the artificial intelligence models as the emotion recognition result.

(6) The information processing apparatus according to any one of (1) to (5),
in which the criterion includes data structured according to a field to which the service is applied.

(7) The information processing apparatus according to (6),
in which the data for each field of application includes a common parameter.

(8) The information processing apparatus according to (7),
in which the common parameter includes at least one of whether or not use of the emotion recognition result for provision of the service is permitted, an exceptional condition for using the emotion recognition result for provision of the service, necessity of agreement of the user for using the emotion recognition result for provision of the service, or necessity of a plurality of artificial intelligence models.

(9) The information processing apparatus according to any one of (1) to (8),
in which the preprocessing unit performs processing of presenting an image that is a target of the emotion recognition, an analysis result of an expression for the image, and an emotion recognition result for the image.

(9-1) The information processing apparatus according to (9),
in which the preprocessing unit displays a recognition result of each of a plurality of emotion levels in a radar chart.

(10) The information processing apparatus according to any one of (1) to (9),
further including an emotion learning unit that performs learning of the artificial intelligence function so as to recognize a human emotion,
in which the preprocessing unit determines whether or not to permit learning of the artificial intelligence function based on the criterion, and
the emotion learning unit performs training to input learning data to the artificial intelligence function and perform the emotion recognition when the preprocessing unit determines to permit the learning.

(10-1) The information processing apparatus according to (10),
in which the emotion learning unit learns the artificial intelligence function so as to recognize the human emotion from a face image.

(11) The information processing apparatus according to (10),
in which the emotion learning unit performs training of the artificial intelligence function configured by a neural network by deep learning.

(12) An information processing method including:
a preprocessing step of determining whether or not to permit provision of a service based on emotion recognition on the basis of a predetermined criterion;
an emotion estimation processing step of performing the emotion recognition for a user by using an artificial intelligence function when it is determined to permit the provision of the service in the preprocessing step; and
a service providing processing step of providing a service based on an emotion recognition result by the emotion estimation processing step.

(13) An artificial intelligence model manufacturing method of,
in an artificial intelligence apparatus that provides a service using a result of emotion recognition using an artificial intelligence function, determining whether or not to permit provision of a service based on the emotion recognition on the basis of a predetermined criterion, and when determining to permit the provision of the service, performing training so as to enable emotion learning by inputting learning data to the artificial intelligence function, to manufacture an artificial intelligence model capable of the emotion recognition.

(13-1) The artificial intelligence model manufacturing method according to (13),
in which training of the artificial intelligence function is performed by deep learning.

REFERENCE SIGNS LIST

100 Information processing apparatus
101 CPU
102 Storage device
103 Bus
104 Camera
105 Microphone
106 Display
107 Speaker
108 Sensor group
109 Actuator group
110 Communication unit
120 Cloud infrastructure
200 Artificial intelligence system
210 Computer device
211 Storage device
212 Processing apparatus
213 User interface
214 Input and output source
220 Cloud computer apparatus
230 Server computer apparatus
240 Database
250 Communication medium
301 Learning data preprocessing logic
302 Communication module
303 Local database
304 Emotion learning processing logic
305 Context recognition processing logic
306 Database

The invention claimed is:
1. An information processing apparatus, comprising:
a central processing unit (CPU) configured to:
determine, based on a specific criterion, a first permission for a provision of a service to a user, wherein
the specific criterion includes a data structure,
the data structure is based on a plurality of application fields of the service,
the data structure includes data corresponding to each of the plurality of application fields, and
the data of each of the plurality of application fields includes a common parameter;
perform an emotion recognition process for the user based on the determined first permission and an artificial intelligence function, wherein the service is based on the performed emotion recognition process;

determine an emotion recognition result based on the performed emotion recognition process; and
provide the service to the user base on the determined first permission and the determined emotion recognition result.

2. The information processing apparatus according to claim 1, wherein the CPU is further configured to:
determine, based on the specific criterion, a necessity of an agreement from the user, wherein the agreement from the user indicates an allowance to use the emotion recognition result for the service; and
request the user to provide the agreement.

3. The information processing apparatus according to claim 2, wherein
the CPU is further configured to determine, based on an exceptional condition, a second permission to use the emotion recognition result for the service, and
the exceptional condition includes:
a first condition that indicates the agreement of the user; and
a second condition that indicates that a provision of the emotion recognition result is unavailable for the service.

4. The information processing apparatus according to claim 1, further comprising a memory, wherein
the specific criterion includes data that indicates a requirement of a plurality of artificial intelligence models in the memory,
the CPU is further configured to determine, based on determination that the memory includes the plurality of artificial intelligence models, the first permission for the provision of the service, and
the plurality of artificial intelligence models includes the artificial intelligence function.

5. The information processing apparatus according to claim 4, wherein
the CPU is further configured to:
perform an inference process based on the plurality of artificial intelligence models; and
output, as the emotion recognition result, a set of inference results based on the performed inference process, wherein the set of inference results includes an inference result corresponding to each of the plurality of artificial intelligence models.

6. The information processing apparatus according to claim 1, further comprising a memory, wherein
the common parameter indicates at least one of a second permission to use the emotion recognition result for the service, an exceptional condition to use the emotion recognition result for the provision of the service, a necessity of an agreement from the user, or a requirement of a plurality of artificial intelligence models in the memory,
the agreement from the user indicates an allowance to use the emotion recognition result for the service, and
the plurality of artificial intelligence models includes the artificial intelligence function.

7. The information processing apparatus according to claim 1, further comprising a display device, wherein the CPU is further configured to:
perform the emotion recognition process on an image;
analyse an expression of the image; and
control the display device to present the image, an analysis result of the expression, and the emotion recognition result of the image.

8. The information processing apparatus according to claim 1, wherein the CPU is further configured to:

determine, based on the specific criterion, a second permission to perform a learning process of the artificial intelligence function, wherein the learning process of the artificial intelligence function is for recognition of a human emotion;
perform the learning process of the artificial intelligence function based on the determined second permission;
train the artificial intelligence function based on an input learning data, wherein the input learning data is based on the performed learning process; and
perform the emotion recognition process based on the determined second permission.

9. The information processing apparatus according to claim 8, wherein
the CPU is further configured to train the artificial intelligence function based on a deep learning process, and
the artificial intelligence function includes a neural network.

10. An information processing method, comprising:
determining, based on a specific criterion, a permission for a provision of a service to a user, wherein
the specific criterion includes a data structure,
the data structure is based on a plurality of application fields of the service,
the data structure includes data corresponding to each of the plurality of application fields, and
the data of each of the plurality of application fields includes a common parameter;
performing an emotion recognition process for the user based on the determined permission and an artificial intelligence function, wherein the service is based on the performed emotion recognition process;
determine an emotion recognition result based on the performed emotion recognition process; and
providing the service to the user based on the determined permission and the determined emotion recognition result.

11. A method, comprising:
in an artificial intelligence apparatus;
determining, based on a specific criterion, a permission for a provision of a service to a user, wherein
the specific criterion includes a data structure,
the data structure is based on a plurality of application fields of the service,
the data structure includes data corresponding to each of the plurality of application fields, and
the data of each of the plurality of application fields includes a common parameter;
performing, based on the determined permission and an input learning data, a training process of an artificial intelligence function, wherein the training process corresponds to an emotion learning process of to the artificial intelligence function;
generating an artificial intelligence model based on the performed training process of the artificial intelligence function;
performing an emotion recognition process on the user based on the generated artificial intelligence model; and
providing the service to the user based on the performed emotion recognition process.

* * * * *